US007925362B2

(12) United States Patent
Lee et al.

(10) Patent No.: US 7,925,362 B2
(45) Date of Patent: Apr. 12, 2011

(54) AUTOTUNING METHOD USING INTEGRAL OF RELAY FEEDBACK RESPONSE FOR EXTRACTING PROCESS INFORMATION

(75) Inventors: Jie-Tae Lee, Daegu (KR); Su-Whan Sung, Daegu (KR)

(73) Assignee: Kyungpook National University Industry-Academic Corporation Foundation (KR)

( * ) Notice: Subject to any disclaimer, the term of this patent is extended or adjusted under 35 U.S.C. 154(b) by 552 days.

(21) Appl. No.: 11/810,493

(22) Filed: Jun. 6, 2007

(65) Prior Publication Data

US 2008/0114472 A1    May 15, 2008

(30) Foreign Application Priority Data

Nov. 15, 2006    (KR) .................. 10-2006-0112623

(51) Int. Cl.
*G05B 13/02* (2006.01)
(52) U.S. Cl. .......................... 700/37; 700/42
(58) Field of Classification Search .............. 700/28, 700/29, 32, 37, 42
See application file for complete search history.

(56) References Cited

U.S. PATENT DOCUMENTS

| | | | | |
|---|---|---|---|---|
| 5,283,729 | A  * | 2/1994  | Lloyd ........................ | 700/37 |
| 6,697,767 | B2 * | 2/2004  | Wang et al. ................ | 702/189 |
| 7,035,695 | B2 * | 4/2006  | Boiko ........................ | 700/28 |
| 7,606,624 | B2 * | 10/2009 | Cullen ....................... | 700/29 |

OTHER PUBLICATIONS

Majhi et al., "Tuning of Controllers for Integrating Time Delay Processes", Proceedings of IEEE Region 10 International Conference on Electrical and Electronic Technology, vol. 1, Aug. 19-22, 2001, pp. 317-320.*
Stefanutti et al., "A PID autotuning method for digitally controlled DCDC boost converters", 2005 European Conference on Power Electronics and Applications, pp. 10 pp.*
Stefanutti et al., "Autotuning of Digitally Controlled Buck Converters Based on Relay Feedback", IEEE 36th Power Electronics Specialists Conference, 2005, pp. 2140-2145.*
Wei et al., "Model identification and PID control of long time delay processes", Proceedings of the 4th World Congress on Intelligent Control and Automation, vol. 2, 2002, pp. 974-978.*
Benouarets et al., "Autotuning design methods for a Smith predictor control scheme", International Conference on Control, vol. 1, 1994, pp. 795-800.*
Lee et al., "Integrals of Relay Feedback Responses", SICE-ICASE, International Joint Conference, Publication Year: 2006, pp. 3308-3313.*
Leva, "Model-based proportional-integral-derivative autotuning improved with relay feedback identification", IEE Proceedings—Control Theory and Applications, vol. 152, Issue: 2, Publication Year: 2005, pp. 247-256.*
Lee et al., "Implementation of intelligent PID auto-tuning", IEEE International Symposium on Circuits and Systems, Publication Year: 1991, vol. 4, pp. 2316-2319.*

* cited by examiner

*Primary Examiner* — Crystal J Barnes-Bullock
(74) *Attorney, Agent, or Firm* — Patents+TMS, P.C.

(57) ABSTRACT

An autotuning method using an integral of a relay feedback response is disclosed, which obtains an ultimate data and frequency model of a process with greatly removing effects of harmonics by using integral of a relay feedback signal. The autotuning method using an integral of a relay feedback response comprises the first step for integrating a process data; and the second step for removing effects of harmonics after the first step and computing an ultimate gain, a frequency model and a parametric process model.

19 Claims, 14 Drawing Sheets relay feedback method and integral

PRIOR ART relay feedback signal response and integral response

PRIOR ART response of relay signal in cyclic steady state and sine signal critical information modeling performances of proposed methods and conventional methods in case of first degree time delay process of $(G(s) = exp(-ds)/(\tau s + 1))$ frequency model performances of proposed methods and conventional method in case of first degree time delay process of $(G(s)=exp(-ds)/(\tau s+1))$ time constant modeling performance in case of $(G(s)=exp(-ds)/(\tau s+1))$ time constant modeling performance with respect to measurement error
in case of first degree time delay process of $(G(s)=\exp(-ds)/(\tau s+1))$ relation between curvature and first degree time delay process of
$(G(s)=exp(-ds)/(\tau s+1))$ first degree time delay modeling performance in higher degree process
(Solid line: Eq. (32), dotted line: Eq. (34)+Eq. (37), dashed line: Eq. (35)+Eq. (38) and Eq. (36)+Eq.(39)).

first degree time delay modeling performance in higher degree process (Solid line: FOPTD model, dotted line: CDPTD model, dashed line: SOPTD model).

relay feedback response under measurement noise condition modeling performance (Solid line: process, dotted line: FOPTD model, dash-dotted line: CDPTD model, and dashed line: SOPTD model).

US 7,925,362 B2

AUTOTUNING METHOD USING INTEGRAL OF RELAY FEEDBACK RESPONSE FOR EXTRACTING PROCESS INFORMATION

CLAIM OF PRIORITY

This application claims the benefit of Korean Patent Application No. 2006-112623 filed on 15, Nov., 2006, in the Korean Intellectual Property Office, the disclosure of which is incorporated herein by reference.

BACKGROUND OF THE INVENTION

1. Cross Reference to the Related Art

[1] Abramowitz, M, Stegun, I A. *Handbook of mathematical functions*, Dover Publications, NY, 1972.
[2] Astrom, K J, Hagglund, T. Automatic tuning of simple regulators with specifications on phase and amplitude margins. Automatica, 20, 645, 1984.
[3] Astrom, K J, Hagglund, T. PID controllers. $2^{nd}$ ed., Instrument Society of America, NC, 1995
[4] Chiang, R, Yu, C. Monitoring Procedure for Intelligent Control: On-Line Identification of Maximum Closed-Loop Log Modulus, Ind. Eng. Chem. Research, 32, 90, 1993
[5] Friman M, Waller, K V. A two channel relay for autotuning. Ind. Eng. Chem. Research, 36, 2662-2671, 1997.
[6] Hang, C C, Astrom, K J, Wang Q G. Relay feedback auto-tuning of process controllers—a tutorial review. J. Process Control, 12, 143-162, 2002.
[7] Hang, C C, Astrom, K J, Ho, W K. Relay auto-tuning in the presence of static load disturbance. Automatica, 29, 563-564, 1993.
[8] Huang, H P, Jeng, J C, Luo, K Y. Auto-tune system using single-run relay feedback test and model-based controller design. J. Process Control, 15, 713-727, 2005.
[9] Kaya, I, Atherton, D P. Parameter estimation from relay autotuning with asymmetric limit cycle data. J. Process Control, 11, 429-439, 2001.
[10] Kim, Y H. P I Controller Tuning Using Modified Relay Feedback Method, J. Chem. Eng. Japan, 28, 118, 1995.
[11] Kreyszig, E. Advanced engineering mathematics. $8^{th}$ ed., New York, Wiley, 1999.
[12] Luyben, W L. Getting more information from relay feedback tests. Ind. Eng. Chem. Research, 40, 4391, 2001.
[13] Ma, M D, Zhu, X J. A simple auto-tuner in frequency domain. Comp. Chem. Eng., 2006.
[14] Panda, R C, Yu, C C. Analytic expressions for relay feedback responses. J. Process Control, 13, 48, 2003.
[15] Panda, R C, Yu, C C. Shape factor of relay response curves and its use in autotuning. J. Process Control, 15, 893-906, 2005.
[16] Shen, S H, Wu, J S, Yu, C C. Use of biased relay feedback method for system identification. AIChE J., 42, 1174-1180, 1996a.
[17] Shen, S H, Wu, J S, Yu, C C. Autotune identification under load disturbance. Ind. Eng. Chem. Research, 35, 1642-1651, 1996b.
[18] Sung, S W, Park, J H, Lee, I. Modified relay feedback method. Ind. Eng. Chem. Research, 34, 4133-4135, 1995.
[19] Sung, S W, Lee, I. Enhanced relay feedback method, Ind. Eng. Chem. Research, 36, 5526, 1997.
[20] Sung, S W, Lee, J., Lee, D H, Han, J H, Park, Y S. A Two-Channel Relay Feedback Method under Static Disturbances, Ind. Eng. Chem. Research, 45, 4071, 2006.
[21] Sung, S W, Lee, J. Relay feedback method under large static disturbances. Automatica, 42, 353-356, 2006.
[22] Sung, S W, O, J, Lee, I, Lee, J, Yi, S H. Automatic Tuning of PID Controller using Second-Order Plus Time Delay Model, J. Chem. Eng. Japan, 29, 990, 1996.
[23] Tan, K K, Lee, T H, Huang, S, Chua, K Y, Ferdous, R. Improved critical point estimation using a preload relay. J. Process Control, 2005.
[24] Tan, K K, Lee, T H, Wang, Q G. Enhanced automatic tuning procedure for process control of PI/PID controllers, AIChE J., 42, 2555, 1996.
[25] Wang, Q G, Hang, C C, Bi, Q. Process frequency response estimation from relay feedback. Control Eng. Practice, 5, 1293-1302, 1997a.
[26] Wang, Q G, Hang, C C, Zou, B. Low order modeling from relay feedback. Ind. Eng. Chem. Research, 36, 375, 1997b.
[27] Yu, C C. Autotuning of PID controllers: A relay feedback approach. $2^{nd}$ ed. Springer, London, 2006.

2. Field of the Invention

The present invention relates to an autotuning method for a PID (Proportional Integral Derivative) controller, and in particular to an autotuning method using an integral of a relay feedback response in which an ultimate data and a frequency model of a process can be reliably obtained by integrating a relay feedback signal and removing a lot of harmonics.

3. Description of the Related Art

PID controller has been widely used in various industrial facilities due to its simple structure and excellent control performance. The PID controller may solely use a proportional control, an integral control or a derivative control or may combine and use at least two controls of the above methods.

The relay feedback methods for autotuning of a PID controller have been widely used. In the conventional relay feedback methods, a frequency model of a process is computed using an oscillation period and an oscillation magnitude of input and output responses. The above method will be described in details as follows.

Since [2] Astrom and Hagglund (1984) introduced the autotuning method, which used the relay feedback test, many variations have been proposed for autotuning of PID controllers ([3] Astrom and Hagglund, 1995; Hang et al., 2002; Yu, 2006). Several methods such as a saturation relay ([27] Yu, 2006), relay with a P control preload ([23] Tan et al., 2005) and a two level relay ([28] Sung et al., 1995) were introduced to obtain more accurate ultimate data of the process by suppressing the effects of the high order harmonic terms. To obtain a Nyquist point other than the ultimate point, a relay with hysteresis or a dynamic element such as time delay has been used ([3] Astrom and Hagglund, 1995; [10] Kim, 1995; [24] Tan et al., 1996; [4] Chiang and Yu, 1993). Recently, a two channel relay has been proposed to obtain a Nyquist point information corresponding to a given phase angle ([5] Friman and Waller, 1997; [20] Sung et al., 2006). Methods to reject unknown load disturbances and restore symmetric relay oscillations have been available ([7] Hang et al., 1993; [17] Shen et al, 1996b; [21] Sung and Lee, 2006). A biased relay has been used to obtain the process steady state gain as well as the ultimate data ([16] Shen et al., 1996a) from only one relay test. [8] Huang et al. (2005) used the integral of the relay transient to obtain the steady state gain of the process.

Many Nyquist points of the process dynamics can be extracted from only one relay experiment by applying the FFT (fast Fourier transformation) technique to the whole transient responses from the start to the final cyclic steady-state part of the relay responses ([25] Wang et al., 1997a). However, the computations are somewhat complex and the complete transient responses must be stored. For the same purpose, Laplace transformation of a periodic function has been used to obtain many frequency responses from one relay test ([13] Ma and Zhu, 2006).

The shape factor (Luyben, 2001) has been used to extract a three-parameter model from the cyclic steady state part of the relay response. Several authors ([9] Kaya and Atherton, 2001; [14] Panda and Yu, 2003) derived exact expressions relating the parameters of the FOPTD process to the measured data of the relay response. They used the analytic expressions to extract parameters of the FOPTD model. However, the methods based only on the cyclic steady state data cannot provide acceptable robustness for uncertainty such as process/model mismatches and nonlinearity. They may provide poor model parameter estimates such as negative gain when the model structure is different from that of the process ([15] Panda and Yu, 2005). The second order plus time delay (SOPTD) model can be also extracted from the cyclic steady state part of the relay response using analytic equations. However, as in the FOPTD model case, the method is also not robust. A relay experiment with a subsequent P control experiment or another relay feedback test can be used to obtain an SOPTD model robustly ([22] Sung et al., 1996; [19] Sung and Lee, 1997).

SUMMARY OF THE INVENTION

The present invention has been made to solve the foregoing problems of the prior art and its object is to provide an autotuning method.

It is another object of the present invention to provide an autotuning method which obtains an ultimate data and frequency model of a process with greatly removing effects of harmonics by using an integral of relay feedback signal.

To achieve the above objects, there is provided an autotuning method using an integral of a relay feedback response which comprises:

the first step for integrating a process data; and the second step for removing any effects of harmonics after the first step and computing an ultimate gain.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS OF THE INVENTION

The autotuning method using an integral of a relay feedback response according to an embodiment of the present invention will be described with reference to the accompanying drawings.

Figure 2:
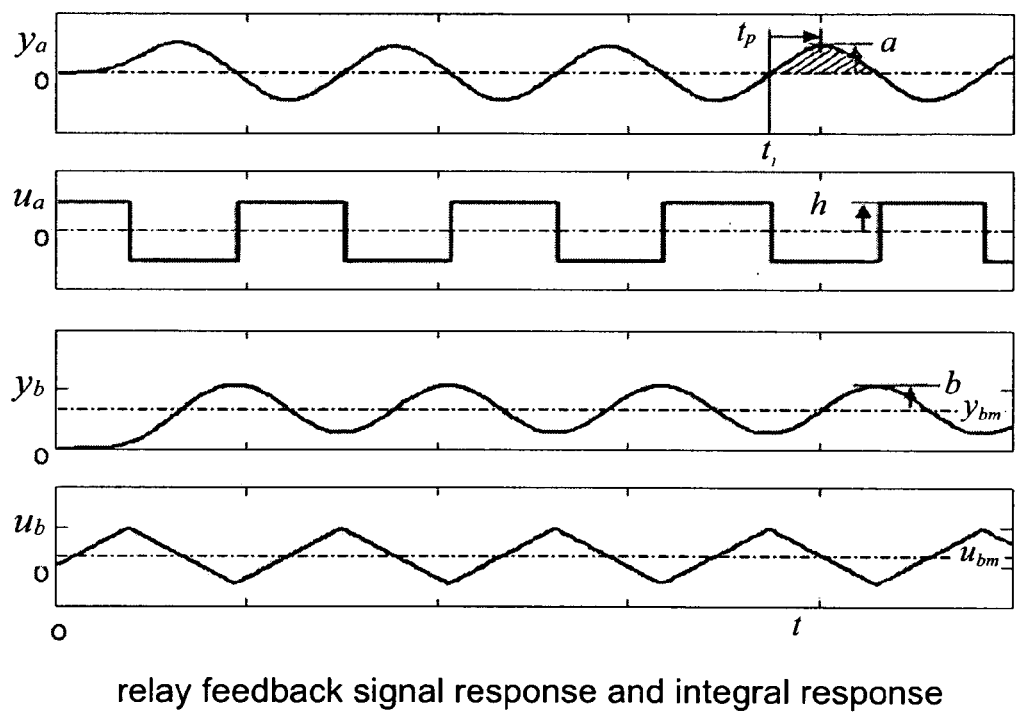
FIG. 2 is a view for describing a conventional relay feedback signal response and integral response.
Figure 3:
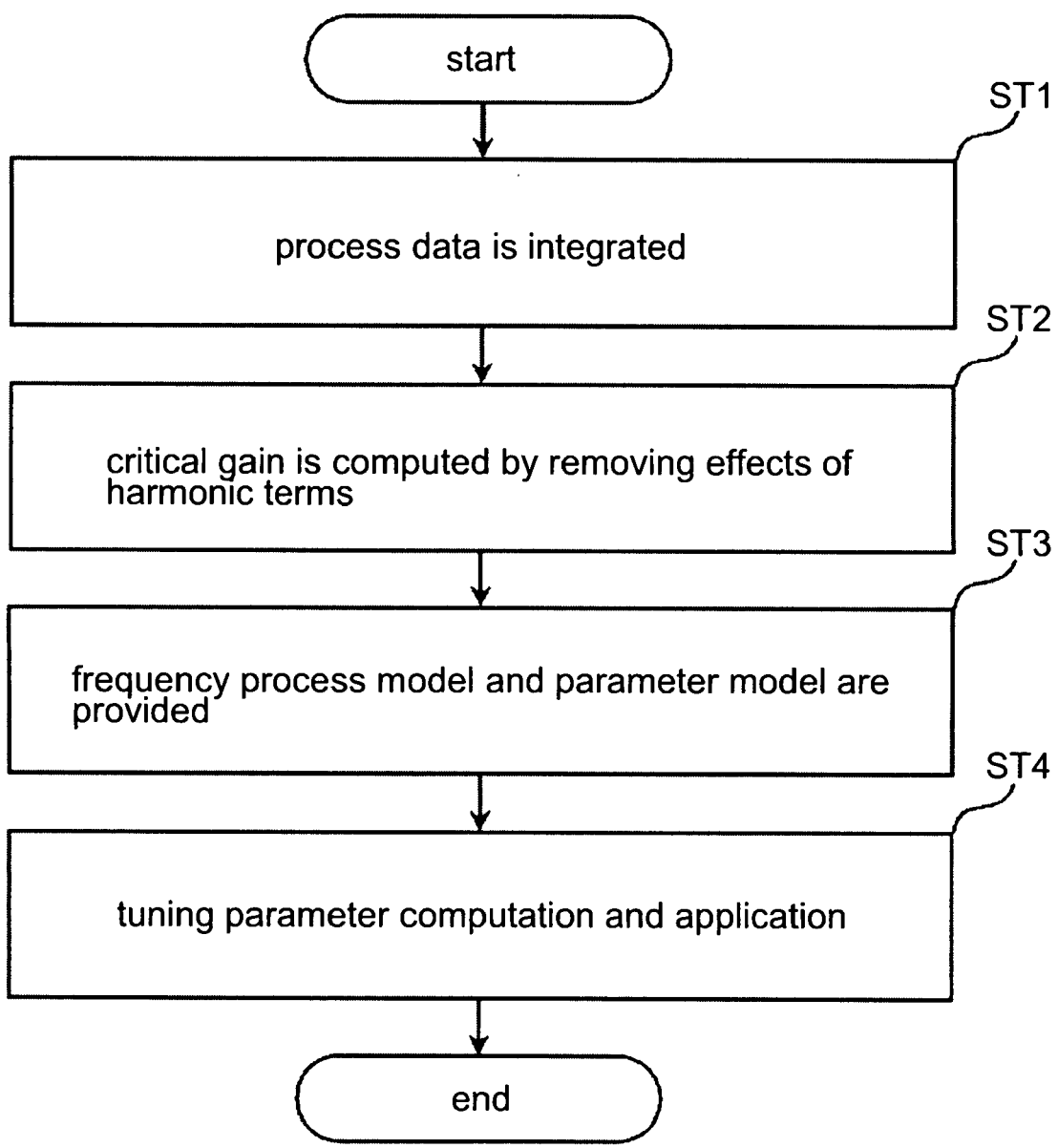
FIG. 3 is a flow chart of an autotuning method using an integral of a relay feedback response according to an embodiment of the present invention.

FIG. 2 is a view for describing a conventional relay feedback signal response and integral response, and FIG. 3 is a flow chart of an autotuning method using an integral of a relay feedback response according to an embodiment of the present invention.

As shown therein, an autotuning method using an integral of a relay feedback response comprises: the first step(ST1) for integrating a process data; and the second step(ST2) for removing any effects of harmonics after the first step and computing an ultimate gain.

The autotuning method using an integral of a relay feedback response further comprises the third step(ST3) for providing a frequency process model and a parameter model after the second step.

Figure 4:
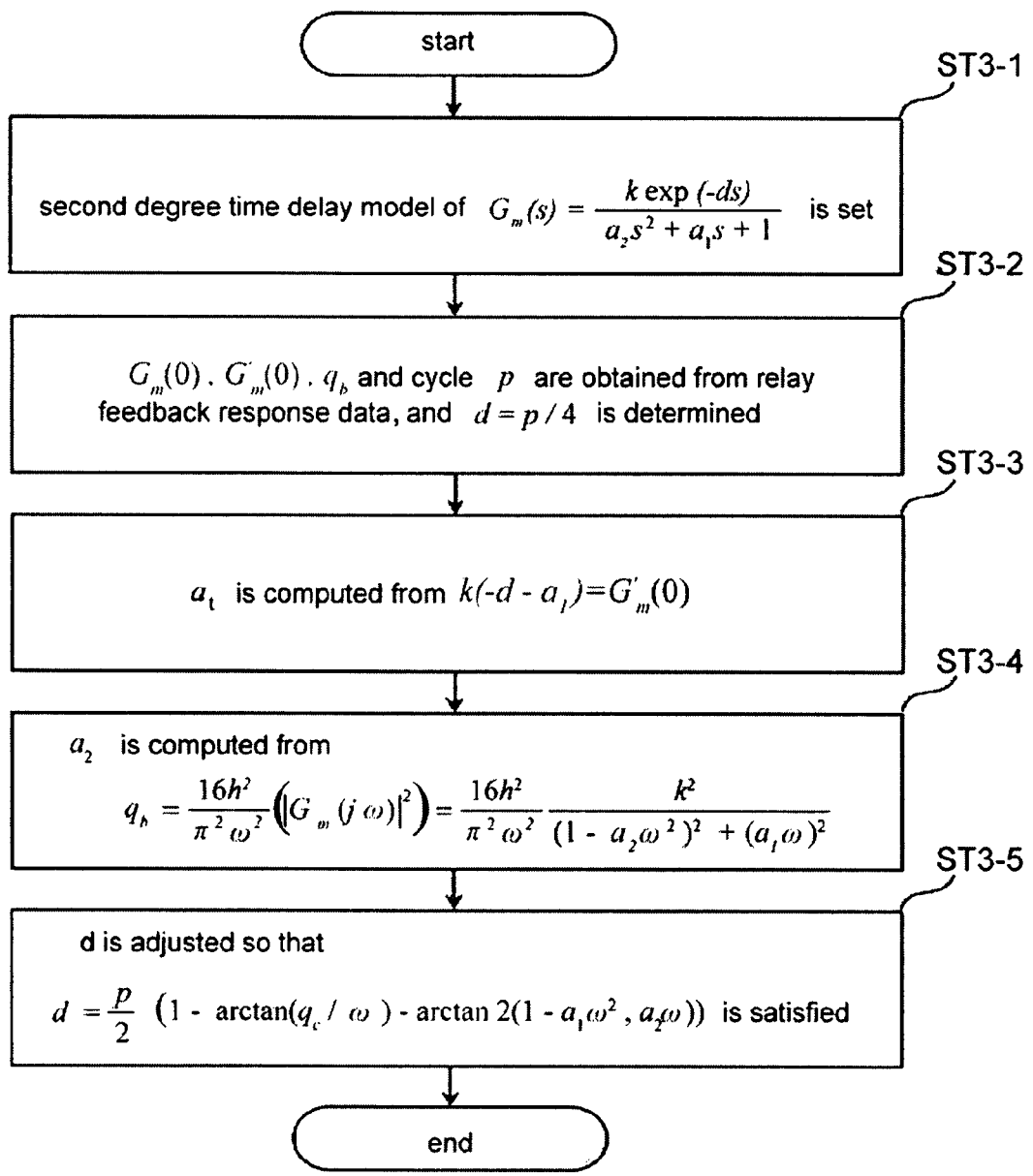
FIG. 4 is a detailed flow chart for a provision of a parameter model of FIG. 3.

As shown in FIG. 4, the third step comprises a step 3-1 (ST3-1) for setting a second time delay model of $$G_m(S) = \frac{k\exp(-ds)}{a_2 s^2 + a_1 s + 1};$$

a step 3-2(ST3-2) for obtaining $G_m(0)$, $G_m'(0)$, $q_b$ and the oscillation period p from relay feedback response and determining d=p/4; a step 3-3(ST3-3) for computing $a_1$ from $k(-d-a_1)=G_m^{-1}(0)$ after the step 3-2; a step 3-4(ST3-4) for computing $a_2$ from $$q_b = \frac{16h^2}{\pi^2 \omega^2}(|G_m(j\omega)|^2) = \frac{16h^2}{\pi^2 \omega^2} \frac{k^2}{(1-a_2\omega^2)^2 + (a_1\omega)^2}$$

after the step 3-3; and a step 3-5(ST3-5) for adjusting d so that $$d = \frac{p}{2}(1 - \arctan(q_c/\omega) - \arctan2(1 - a_1\omega^2, a_2\omega))$$

is satisfied after the step 3-4.

The autotuning method using an integral of a relay feedback response further comprises the fourth step (ST4) for computing and applying a controller tuning parameter using a tuning method after the third step (ST3).

The autotuning method using an integral of a relay feedback response according to an embodiment of the present invention will be described in details with reference to the accompanying drawings. In the description of the present invention, when the detailed description with respect to the known function or construction could make the subject matters of the present invention unobvious, the detailed description of the same will be omitted. The terms, which will be described later, are defined in consideration with the functions of the present invention. The terms may change based on the intention or judicial precedent, and the meaning of each term should be interpreted based on the contents of the specification of the present invention.

In the present invention, an ultimate data and frequency model of a process are supposed to be obtained by integrating and using a relay feedback signal and greatly removing effects of harmonics. In the conventional art, a frequency model of a process is computed using an oscillation period and an oscillation magnitude of a process input and output data. In the present invention, a new method is disclosed, in which a signal obtained by integrating a process data is used as compared to a conventional art in which an input and output data of a process are directly used. In the present invention, an accuracy of an obtained frequency process model and parameter model are greatly enhanced since the effects of harmonics are largely removed using an integral of a process data.

So, the present invention discloses a method for obtaining an accurate frequency information and parameter model from a conventional relay feedback response. According to the method of the present invention, a more accurate frequency process model and parameter model can be obtained by using a signal obtained by integrating a process data and removing effects of a harmonic term in order to enhance a process modeling performance as compared to the conventional art in which an input and output data of a process are directly used. In the present invention, it does not need to store all the relay feedback response data, and the computational load is very light. The present invention may be well adapted to an industrial PID controller which uses a low performance microprocessor.

1. Conventional Relay Feedback Method

Figure 1:
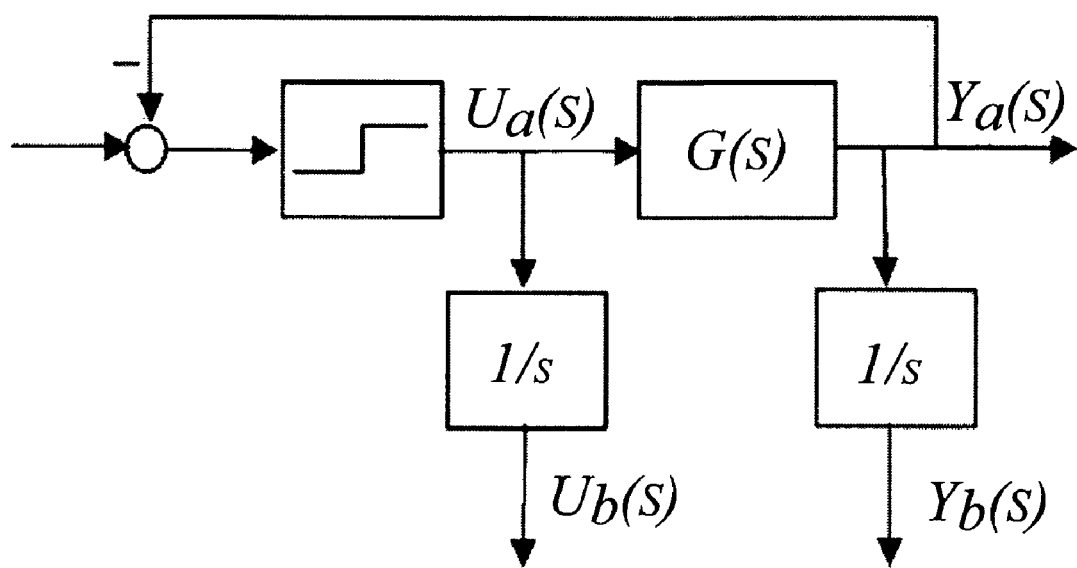
FIG. 1 is a view for describing a conventional relay feedback method and integral.

We consider the classical relay feedback system as shown in FIG. 1 and FIG. 2 to derive the required equations in this research. We start the relay feedback system at a steady state condition.

As shown in FIG. 1, $U_a(s)$ is a process input, and $Y_a(s)$ is a process output, and $1/s$ is an integral, and $U_b(s)$ is an integral signal of a process input, and $Y_b(s)$ is an integral signal of a process output, and $G(s)$ is a transfer function of a process.

In the first step, a relay on output is applied to a process until a process output increases and reaches a certain given value. In the second step, when a process output is greater than the initial state, a relay off output is adapted. When the process output is opposite, a relay on output is adapted. After three cycles in the above manner, the process output and the relay output become a cyclic steady state. Namely, a process output has a certain oscillation period and magnitude.

[2] Astrom and Hagglund (1984) used this oscillation to extract approximate ultimate data and tune the proportional-integral-derivative (PID) controllers automatically. Let the input and output trajectories be $u_a(t)$ and $y_a(t)$ for the conventional relay feedback system, respectively, when $t_1$, $u_a(t)$ and $y_a(t)$ are assumed to be fully developed (cyclic steady state). Then it can be represented by the Fourier series as $$u_a(\tilde{t}) = \frac{4h}{\pi}\left(\sin(\omega\tilde{t}) + \frac{1}{3}\sin(3\omega\tilde{t}) + \frac{1}{5}\sin(5\omega\tilde{t}) + \ldots\right) \quad \text{[Equation 1]}$$

where $\tilde{t}=t-t_1$ and h is the relay amplitude. Let p and $\omega=2\pi/p$ are the period and the frequency of the relay feedback oscillation. Equation 1 is valid for $$\tilde{t}=t-t_1 \geq 0 \quad \text{[Equation 2]}$$

The output corresponding to $u_a(\tilde{t})$ is $$y_a(\tilde{t}) = \frac{4h}{\pi}\Bigg(|G(j\omega)|\sin(\omega\tilde{t} + \angle G(j\omega)) + \quad \text{[Equation 3]}$$
$$\frac{1}{3}|G(j3\omega)|\sin(3\omega\tilde{t} + \angle G(j3\omega)) + \ldots\Bigg)$$

where G(s) is the process transfer function. Neglecting the high harmonic terms and assuming $\angle G(j\omega_u)\approx-\pi$, we obtain $u_a(\tilde{t})\approx 4h\sin(\omega_u\tilde{t})/\pi$, $y_a(\tilde{t})\approx 4h|G(j\omega_u)|\sin(\omega_u\tilde{t}+\angle G(j\omega_u))/\pi\approx-4h|G(j\omega_u)|\sin(\omega_u\tilde{t})/\pi$. We obtain the following approximate ultimate period $P_u$ and ultimate gain $K_{cu}$ as $$P_u = p \quad \text{[Equation 4]}$$

$$K_{cu} = \frac{4h}{\pi a} \quad \text{[Equation 5]}$$

where $P_u$ and $K_{cu}$ are the ultimate period and the ultimate gain, respectively, and a is the measured amplitude of $y_a(t)$. It should be noted that the estimated ultimate data are approximate because we neglect the high harmonic terms. As a result, the ultimate period of equation 4 and the ultimate gain of equation 5 show relative errors up to 5% and 18%, respectively, for the first order plus time delay (FOPTD) process. In this case, the ultimate gain error may not be acceptable. It is noted that the ultimate gain error of 18% decreases the controller performance significantly.

2. Proposed Methods for Ultimate Data Estimation

In this research, we use integrals of the process input and output instead of the point data to obtain more accurate process frequency information and parametric process models by suppressing the effects of high harmonic terms.

Let $u_b(t)$ and $y_b(t)$ be the integrals of the relay responses as $$u_b(t)=\int_0^t u_a(t)dt \quad \text{[Equation 6]}$$

$$y_b(t)=\int_0^t y_a(t)dt \quad \text{[Equation 7]}$$

Then, $u_b(t)$ is an integral signal of the process input, and $y_b(t)$ is an integral signal of the process output and from equation 1, the response $u_b(t)$ after $t_1$ is $$u_b(\tilde{t}) = u_{bm} - \frac{4h}{\pi\omega}\left(\cos(\omega\tilde{t}) + \frac{1}{9}\cos(3\omega\tilde{t}) + \frac{1}{25}\cos(5\omega\tilde{t}) + \ldots\right) \quad \text{[Equation 8]}$$

where $u_{bm}$ is the mean value of $u_b(t)$ $$u_{bm} = \frac{1}{p}\int_{t_1}^{t_1+p} u_b(t)dt \quad \text{[Equation 9]}$$

From equation 3, the response $y_b(t)$ after $t_1$ can be represented as $$y_b(\tilde{t}) = y_{bm} - \frac{4h}{\pi\omega}\Big(|G(j\omega)|\cos(\omega\tilde{t} + \angle G(j\omega)) + \quad \text{[Equation 10]}$$
$$\frac{1}{9}|G(j3\omega)|\cos(3\omega\tilde{t} + \angle G(j3\omega)) + \ldots\Big)$$

where $y_{bm}$ is the mean value of $y_b(t)$.

$$y_{bm} = \frac{1}{p}\int_{t_1}^{t_1+p} y_b(t)dt/p \quad \text{[Equation 11]}$$

Then, we can construct the following response signal.

$$u_c(\tilde{t}) = u_a(\tilde{t}) + \frac{6\pi}{p}(u_b(\tilde{t} + p/4) - u_{bm}) \quad \text{[Equation 12]}$$
$$= \frac{16h}{\pi}\sin(\omega\tilde{t}) + \frac{52h}{25\pi}\sin(5\omega\tilde{t}) + \ldots$$

$$y_c(\tilde{t}) = y_a(\tilde{t}) + \frac{6\pi}{p}(y_b(\tilde{t} + p/4) - y_{bm}) \quad \text{[Equation 13]}$$

Figure 5:
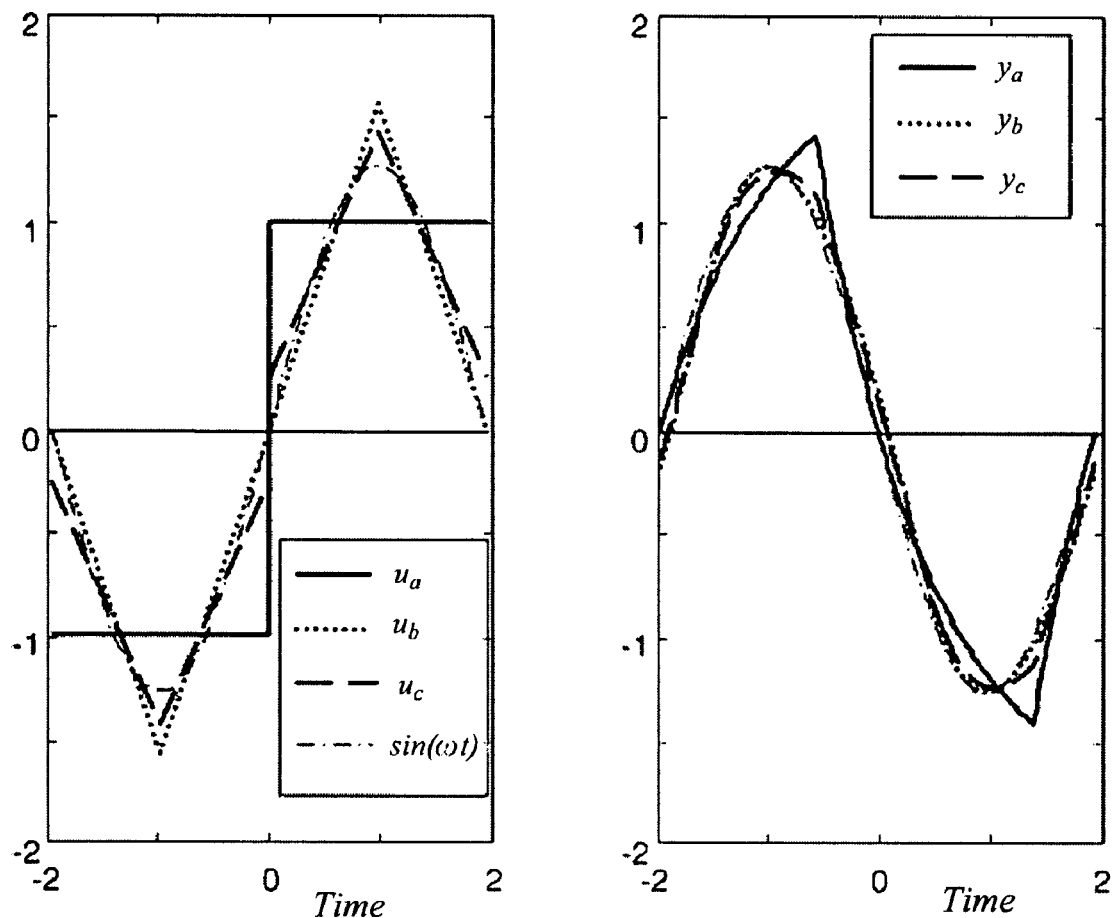
FIG. 5 is a view illustrating a relay signal response and a sine signal in a cyclic steady state.

We should remark that $u_a(\tilde{t})$ is a rectangular wave, $u_b(\tilde{t})$ is a triangular wave and $u_c(\tilde{t})$ is their combination such that the third harmonic term vanishes. The forcing functions of $u_b(\tilde{t})$ and $u_c(\tilde{t})$ are closer to a sinusoidal wave than $u_a(\tilde{t})$. Hence, $y_b(\tilde{t})$ and $y_c(\tilde{t})$ are closer to the sinusoidal wave than $y_c(\tilde{t})$. FIG. 5 shows typical plots of these responses.

By neglecting the high harmonic terms and assuming $\angle G(j\omega) = -\pi$ (equivalently, the relay period is the ultimate period), we obtain $u_b(\tilde{t}) \approx -4h\cos(\omega_u\tilde{t})/\pi$, $y_b(\tilde{t}) \approx 4h|G(j\omega_u)|\cos(\omega_u\tilde{t})/\pi$. Then, we have the following approximate ultimate gain $K_{cu}$.

$$K_{cu} = \frac{2hp}{\pi^2 b} \quad \text{[Equation 14]}$$

Here, b is the amplitude of $y_b(\tilde{t}) - y_{bm}$. The quantity b is physically the half of the shaded area of $y_a(\tilde{t})$ in FIG. 2. As seen in the equations 1, 3, 8 and 10, in $y_b(\tilde{t})$, the fundamental term is much higher than harmonic term as compared to $y_a(\tilde{t})$. So, the equation 14 proposed in the present invention has much more accurate ultimate data as compared to the conventional equation 5.

The following equation is derived from the equations 12 and 13.

$$K_{cu} = \frac{16h}{\pi(a + 6\pi b/p)} = \frac{1}{\frac{1}{4}\left(\frac{\pi a}{4h}\right) + \frac{3}{4}\left(\frac{\pi^2 b}{2hp}\right)} \quad \text{[Equation 15]}$$

$$q_a \equiv \frac{2}{p}\int_{t_1}^{t_1+p} y_a(t)^2 dt \quad \text{[Equation 16]}$$
$$= \frac{16h^2}{\pi^2}\left(|G(j\omega)|^2 + \frac{1}{9}|G(j3\omega)|^2 + \ldots\right)$$

$$q_b \equiv \frac{2}{p}\int_{t_1}^{t_1+p} y_b(t)^2 dt - 2y_{bm}^2 \quad \text{[Equation 17]}$$
$$= \frac{16h^2}{\pi^2\omega^2}\left(|G(j\omega)|^2 + \frac{1}{81}|G(j3\omega)|^2 + \ldots\right)$$

The equation 16 and 17 are derived by applying orthogonality of sine and cosine functions of the equations 3 and 10 (refer to appendix A). To compute the equations 16 and 17, since it is not needed to store all data of $y_a(t)$ and $y_b(t)$, the computation may be available using a simple microprocessor. By ignoring the high harmonic terms in $q_a$, $q_b$, we have $$K_{cu} = \frac{4h}{\pi\sqrt{q_a}} \quad \text{[Equation 18]}$$

$$K_{cu} = \frac{2hp}{\pi^2\sqrt{q_b}} \quad \text{[Equation 19]}$$

When $y_a(\tilde{t})$ and $y_b(\tilde{t})$ are sinusoidal, $a=\sqrt{q_a}$ and $b=\sqrt{q_b}$ provide the same results.

Figure 6:
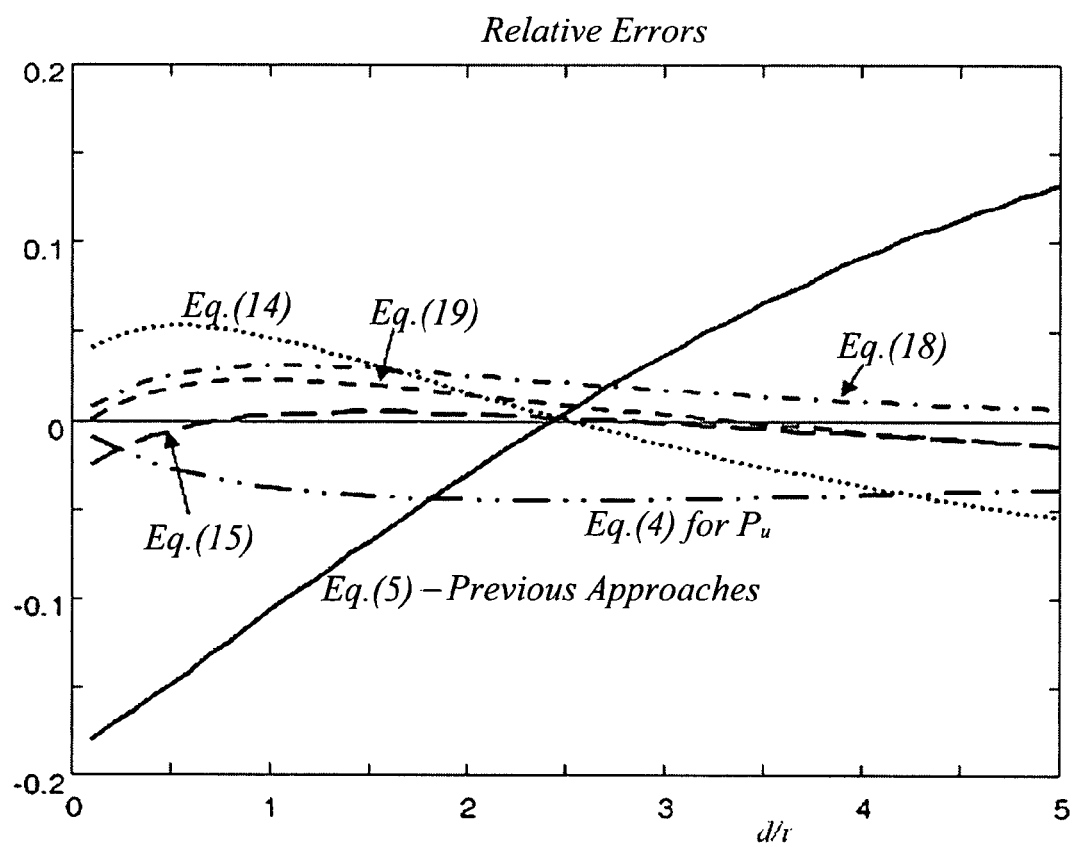
FIG. 6 is a view illustrating a ultimate data modeling performance of a proposed method and a conventional method in case of $(G(s)=\exp(-ds)/(\tau s+1))$ of a first order time delay process.

FIG. 6 shows relative errors in estimated ultimate period and ultimate gains. For FOPTD processes with ratios of time delays to time constants between 0.1 and 5, equations 14, 15, 18 and 19 have relative errors below about 6%. We can see that the errors in equation 5 for the ultimate gain can be improved considerably.

3. Proposed Frequency Model Computation Method

In the previous section, we estimate the ultimate gain on the assumption that the period of relay feedback oscillation is the ultimate period. We omit that assumption in this section.

Our goal in this section is to find the following amplitude ratio and the phase lag of the process at the frequency of relay oscillation.

$$G(j\omega) = A_\omega \exp(j(-\pi + \phi_\omega)), \quad \omega = \frac{2\pi}{p} \quad \text{[Equation 20]}$$

where, $A_\omega = |G(j\omega)|$ and $\phi_\omega = \pi + \angle G(j\omega)$ show the amplitude ratio and phase angle of each process. From equation 16, we can obtain the approximate amplitude ratio as follow, at the frequency $\omega = 2\pi/p$ by neglecting high harmonic terms.

$$\hat{A}_\omega = \frac{\pi\sqrt{q_a}}{4h} \quad \text{[Equation 21]}$$

When $|G(jn\omega)|<|G(j\omega)|$, n=2, 3, ..., its approximation error is $|(\hat{A}_\omega-|G(j\omega)|)/|G(j\omega)|| \leq \sqrt{1+\frac{1}{3}^2+\frac{1}{5}^2+\ldots}-1=0.11$ Now, consider the following quantity.

$$q_c = \left[\frac{2}{p}\int_{t_1}^{t_1+p} u_a(t)y_b(t)dt\right] / $$

$$\left[\frac{2}{p}\int_{t_1}^{t_1+p} u_a(t)y_b(t)dt - 2u_{bm}y_{bm}\right]$$

$$= \frac{\frac{8ph^2}{\pi^3}\left[\sin(\angle G(j\omega)) + \frac{|G(j3\omega)|}{27|G(j\omega)|}\sin(\angle G(j3\omega)) + \ldots\right]}{\frac{4p^2h^2}{\pi^4}\left[\cos(\angle G(j\omega)) + \frac{|G(j3\omega)|}{81|G(j\omega)|}\cos(\angle G(j3\omega)) + \ldots\right]}$$

$$\frac{2\pi}{p}\left[\frac{\sin(\phi_\omega)}{\cos(\phi_\omega)} + \frac{|G(j3\omega)|}{|G(j\omega)|}\left(-\frac{\sin(\angle G(j3\omega))}{27\cos(\phi_\omega)}\right)\right.$$

$$\left.+\frac{\sin(\phi_\omega)\cos(\angle G(j3\omega))}{81\cos^2(\phi_\omega)}\right) + \ldots\right]$$

[Equation 22]

Ignoring high harmonic terms, we have $$\phi_\omega = \arctan\left(\frac{p}{2\pi}q_c\right)$$ [Equation 23]

Accordingly, we can compute the amplitude ratio and phase angle of a process using the equations 21 and 23.

In addition, from the equation 17, neglecting the harmonics, the amplitude ratio estimate of the process at $\omega=2/p$ can be obtained as follows.

$$\hat{A}_\omega = \frac{\pi^2\sqrt{q_b}}{2hp}$$ [Equation 24]

When $|G(jn\omega)|<|G(j\omega)|$, n=2, 3, ..., its approximation error is, $$|(A_\omega - |G(j\omega)|)/|G(j\omega)|| \leq \sqrt{1+1/3^4+1/5^4+\ldots}-1$$ [Equation 25]

$$= \frac{\pi^2}{4\sqrt{6}} - 1$$

$$= 0.0073$$

For an actual application, the equation 25 has reliable accuracy. The phase angle is obtained in the equation 23.

Figure 7:
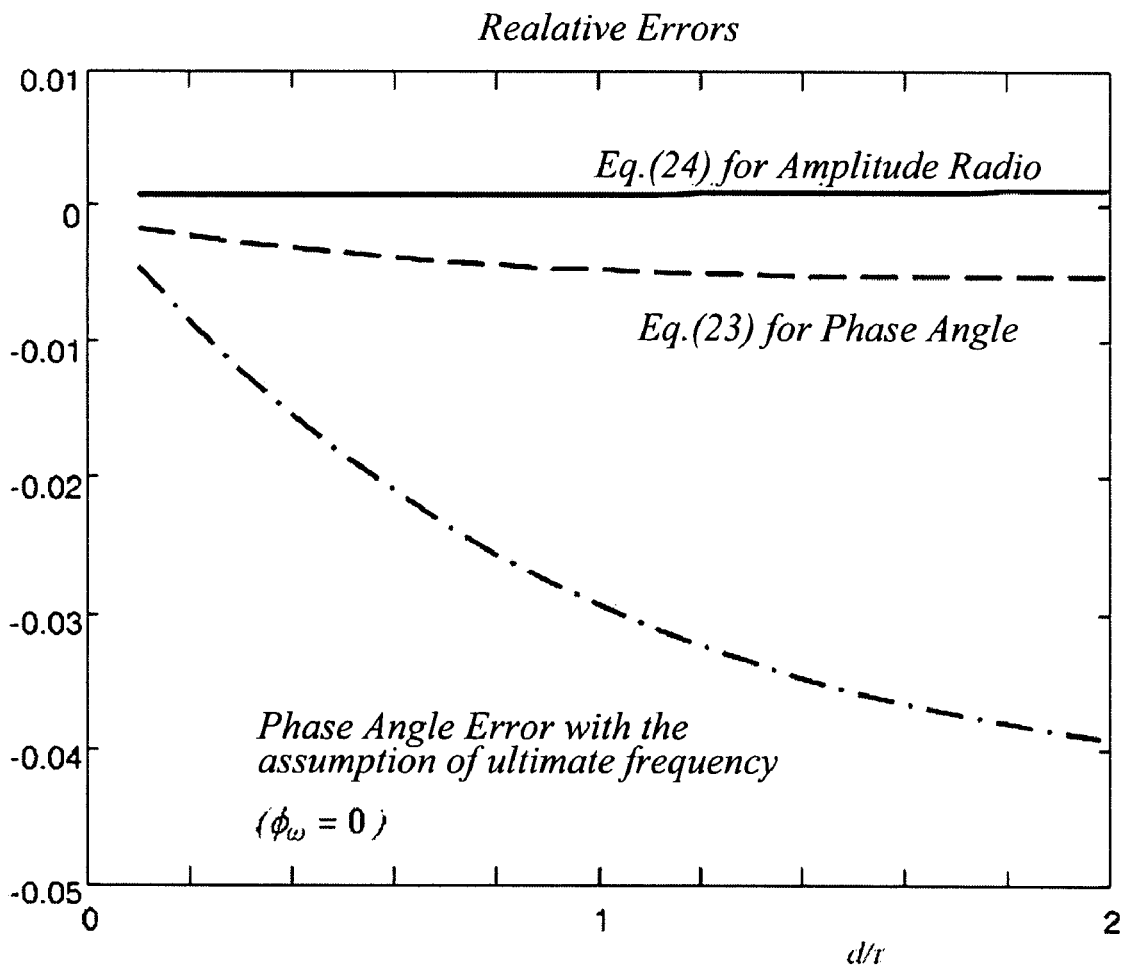
FIG. 7 is a view illustrating a frequency model performance of a proposed method and a conventional method in case of $(G(s)=\exp(-ds)/(\tau s+1))$ of a first order time delay process.

FIG. 7 is a view illustrating an error of the equations 21 and 23 proposed for the first order plus time delay model.

4. Steady State Gain Computation

Process dynamic information contained in the cyclic steady state part of the relay responses corresponds to the frequency of $\omega=2\pi/p$ and its multiples. Therefore, to estimate the process information at the frequency zero, we need the transient relay response from the start to the cyclic steady state. Here a method to extract the process steady state information without storing the relay transient and complex computations is introduced. In [13] Ma and Zhu (2006), it is shown that $$U_a(s) = \int_0^{t_1} u_a(t)\exp(-st)dt + \int_{t_1}^\infty u_a(t)\exp(-st)dt$$ [Equation 26]

$$= \int_0^{t_1} u_a(t)\exp(-st)dt +$$

$$\frac{1}{1-\exp(-ps)}\int_{t_1}^{t_1+p} u_a(t)\exp(-st)dt$$

$$Y_a(s) = \int_0^{t_1} y_a(t)\exp(-st)dt + \int_{t_1}^\infty y_a(t)\exp(-st)dt$$

$$= \int_0^{t_1} y_a(t)\exp(-st)dt +$$

$$\frac{1}{1-\exp(-ps)}\int_{t_1}^{t_1+p} y_a(t)\exp(-st)dt$$

Let's assume, $$\tilde{U}_a(s) = (1-\exp(-ps))U_a(s)$$

$$\tilde{Y}_a(s) = (1-\exp(-ps))Y_a(s)$$ [Equation 27]

Since the transfer function of the process is $G(s)=\tilde{Y}_a(s)/\tilde{U}_a(s)$, we have (Appendix B)

$$G(0) = \lim_{s\to 0}\frac{\tilde{Y}_a(s)}{\tilde{U}_a(s)}$$ [Equation 28]

$$= \tilde{Y}'_a(0)/\tilde{U}'_a(0) = y_{bm}/u_{bm}$$

where $$\tilde{U}'_a(0) = \int_{t_1}^{t_1+p} u_b(t)dt = p \times u_{bm}$$

$$\tilde{Y}'_a(0) = \int_{t_1}^{t_1+p} y_b(t)dt = p \times y_{bm}$$

The above equation 28 for the process steady state gain is equivalent to that in Huang et al. (2005).

We can obtain G'(0) (Appendix B) using the equation 29.

$$G'(0) = \lim_{s\to 0}\frac{\tilde{Y}'_a(s) - G(s)\tilde{U}'_a(s)}{\tilde{U}_a(s)}$$ [Equation 29]

$$= \lim_{s\to 0}\frac{\tilde{Y}''_a(s) - G'(s)\tilde{U}'_a(s) - G(s)\tilde{U}''_a(s)}{\tilde{U}_a(s)}$$

$$= -G'(0) + \frac{\tilde{Y}''_a(0) - G(0)\tilde{U}''_a(0)}{\tilde{U}'_a(0)}$$

$$= \frac{\tilde{Y}''_a(0) - G(0)\tilde{U}''_a(0)}{2\tilde{U}'_a(0)}$$

where $$\tilde{U}''_a(0) = 2p\int_0^{t_1} u_b(t)dt - 2\int_{t_1}^{t_1+p} tu_b(t)dt$$

$$\tilde{Y}''_a(0) = 2p\int_0^{t_1} y_b(t)dt - 2\int_{t_1}^{t_1+p} ty_b(t)dt$$

This process information is very useful in obtaining higher order process models.

5. Proposed Methods for First Order Plus Time Delay Model Estimation

From the relay feedback responses, we can obtain the following first order plus time delay (FOPTD) model.

$$G_m(s) = \frac{k\exp(-ds)}{\tau s + 1} \quad \text{[Equation 30]}$$

The FOPTD model can be determined analytically by the following previous approach ([26] Wang et al., 1997; [9] Kaya and Atherton, 2001; [15] Panda and Yu, 2005).

$$k = \frac{y_{bm}}{u_{bm}} \quad \text{[Equation 31]}$$

$$\tau = \frac{p}{2} \frac{1}{\ln\left(\frac{kh+a}{kh-a}\right)} \quad \text{[Equation 32]}$$

$$d = \tau \ln\left(\frac{\exp(p/(2\tau))+1}{2}\right) \quad \text{[Equation 33]}$$

where a is the amplitude of process output, and p is a relay oscillation period. The question 31 corresponds to the equation 28. When the process is a first order plus time delay, the equations 31, 32 and 33 guarantee exact results.

When the process has a large time delay, the equation 33 does not guarantee an acceptable accuracy. We overcome this problem by using the integrals of the relay feedback responses. From the oscillation amplitude b of $y_b(\hat{t})$ instead of the peak value a of $y_a(\hat{t})$, we can obtain estimate of the time constant as $$\tau = \left(\frac{b}{kh} + \frac{p}{4}\right) / \ln(\chi_1) \quad \text{[Equation 34]}$$

$$\chi_1^{c_1} - 2\chi_1 + 1 = 0$$

$$c_1 = p / \left(\frac{2b}{kh} + \frac{p}{2}\right)$$

This equation can be obtained by rearranging the analytic equations for p and b in Table 1 for the first order plus time delay process.

TABLE 1

| Process | Analytic equations |
|---|---|
| $\frac{k\exp(-ds)}{\tau s + 1}$ | $y_a(\hat{t}) = kh\left(1 - \frac{2}{1+\beta}\exp(-\hat{t}/\tau)\right)$, |
| | $\hat{t} = \tilde{t} - d$, $\beta = \exp(-p/(2\tau))$, h = relay amplitude |
| | $p = 2\tau \ln(2\exp(d/\tau) - 1)$ |
| | $a = kh\frac{1-\beta}{1+\beta}$ |
| | $q_a = (kh)^2\left(2 - \frac{8\tau(1-\beta)}{p(1+\beta)}\right)$ |
| | $y_b(\hat{t}) - y_{bm} = kh\left(\hat{t} - \tau - \frac{p}{4} + \frac{2\tau}{1+\beta}\exp(-\hat{t}/\tau)\right)$ |

TABLE 1-continued

| Process | Analytic equations |
|---|---|
| | $b = kh\left(\tau \ln\left(\frac{1+\beta}{2}\right) + \frac{p}{4}\right)$ |
| | $q_b = (kh)^2\left(\frac{p^2}{24} - 2\tau^2 + \frac{8\tau^3(1-\beta)}{p(1+\beta)}\right)$ |
| | $F = \frac{q_a}{a^2} = 2\left(\frac{1+\beta}{1-\beta}\right)^2 - \frac{8\tau}{p}\frac{1+\beta}{1-\beta}$ |

Here, the proposed last five equations in Table 1 are derived from the first three equations ([15] Panda and Yu, 2005; [9] Kaya and Atherton, 2001).

From the analytic equations for $q_a$ and $q_b$ in Table 1, we can obtain $$\tau = p/(4\chi_2) \quad \text{[Equation 35]}$$

$$\chi_2 = \frac{1}{c_2}\tanh(\chi_2)$$

$$c_2 = 1 - \frac{q_a}{2k^2h^2}$$

$$\tau = p/(4\chi_3) \quad \text{[Equation 36]}$$

$$-c_3\chi_3^3 + \chi_3 = \tanh(\chi_3)$$

$$c_3 = \frac{1}{3} - \frac{8q_b}{p^2k^2h^2}$$

Here, the equations 34, 35 and 36 guarantee an exact modeling result for first order plus time delay processes. However, these methods need solving one-dimensional nonlinear equations. So, for a simpler application, the following approximations are obtained.

$$\chi_1 = \left[2 + \frac{1 - 6(1 - c_1/2)^4}{1 - 2(c_1/2)^{-1/(c_1-1)}}\right]^{1/(c_1-1)} \quad \text{[Equation 37]}$$

$$\chi_2 = \frac{1}{c_2}\tanh\left(\sqrt{15\frac{1-c_2}{6c_2 - 1}}\right) \quad \text{[Equation 38]}$$

$$\chi_3 = \frac{\sqrt{1 - \sqrt{c_3\tanh(1/\sqrt{c_3})}}}{\sqrt{c_3}} \quad \text{[Equation 39]}$$

These equations are obtaining by applying the perturbation analysis to the equations of the table 1.

From equation 19 and $|G(j\omega)| = k/\sqrt{\tau^2\omega^2+1}$, we can also obtain $$\tau = \frac{p}{2\pi}\sqrt{\frac{4p^2k^2h^2}{\pi^4 q_b} - 1} \quad \text{[Equation 40]}$$

In summary, we estimate the time constant of the FOPTD model using one of the proposed methods of equations 31, 33 and 40.

Figure 8:
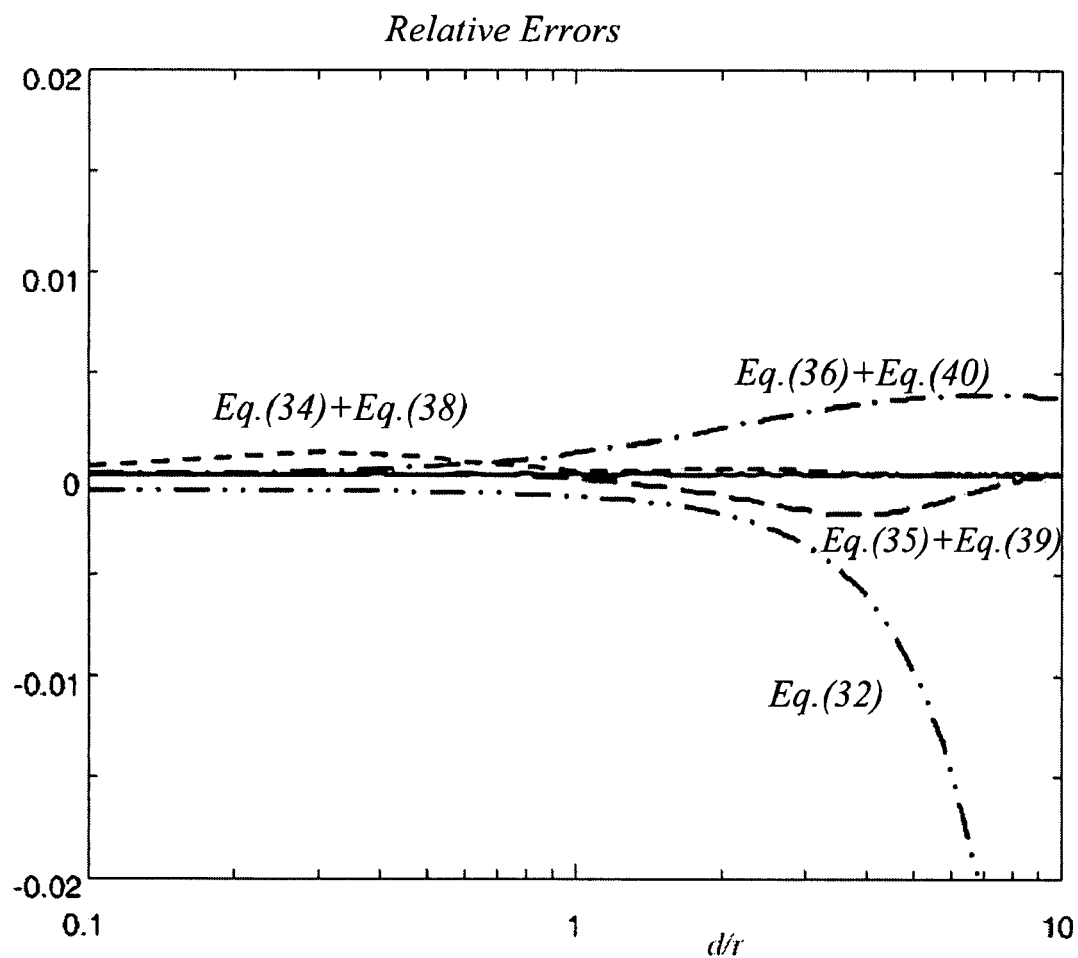
FIG. 8 is a view illustrating a time constant modeling performance in case of $(G(s)=\exp(-ds)/(\tau s+1))$ of a first order time delay process.

FIG. 8 is a view illustrating a modeling error when the methods of the equations 34~36 and the approximate equations 37~40 are used. The approximate equations show a very accurate result with less than 1% except for the equation 40.

Figure 9:
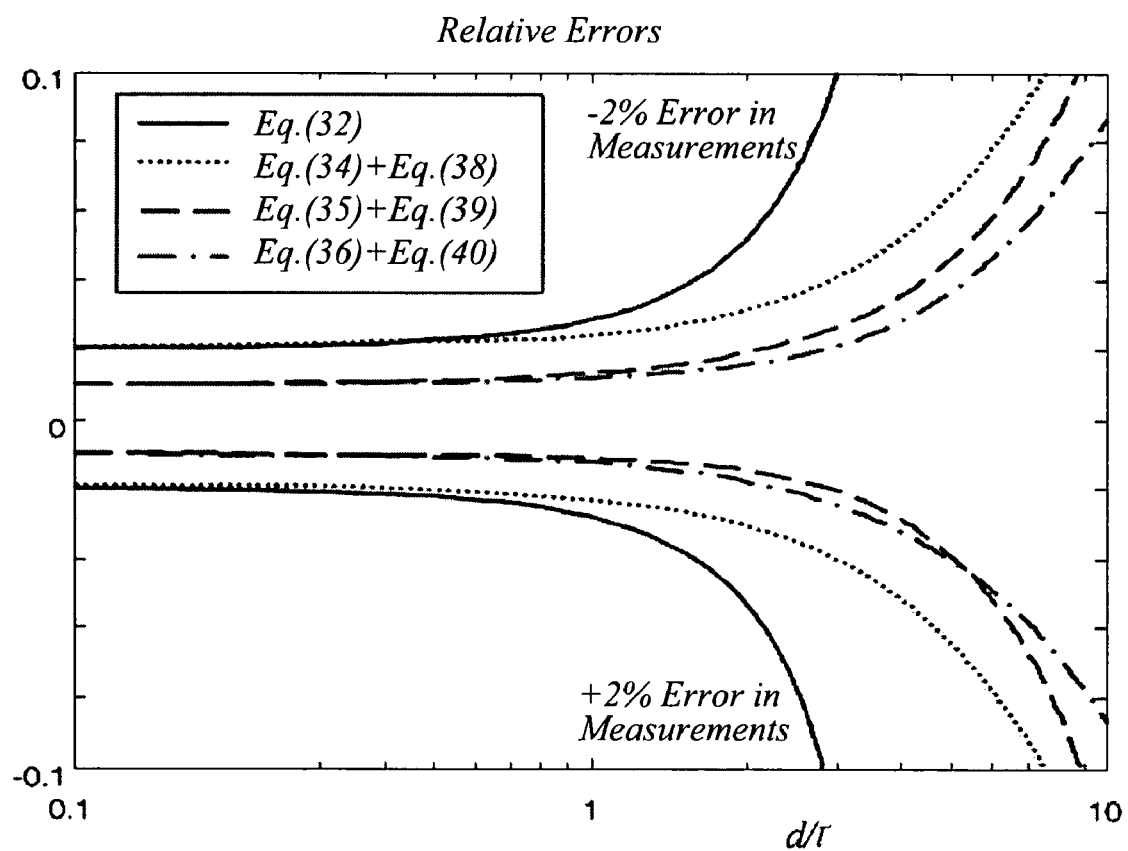
FIG. 9 is a view illustrating a time constant modeling performance with respect to a measurement error in case of $(G(s)=\exp(-ds)/(\tau s+1))$ of a first order time delay process.

FIG. 9 is a view illustrating a modeling error when the measurement values a, b, $q_a$ and $q_b$ have measurement errors. The equation 32, which is a conventional method for obtaining a time constant from a, produces a result which is very sensitive to the measurement error. The above bad results are obtained since the variation of the time constant does not largely affect the value a of $y_a(t)$ in the case that the process has a large time delay.

According to ([12] Luyben (2001)), the curvature factor is useful when the value of $d/\tau$ is approximately derived. In the present invention, the curvature factor based on the following equations is preferably recommended.

$$F = q_a/a^2 \qquad \text{[Equation 41]}$$

Figure 10:
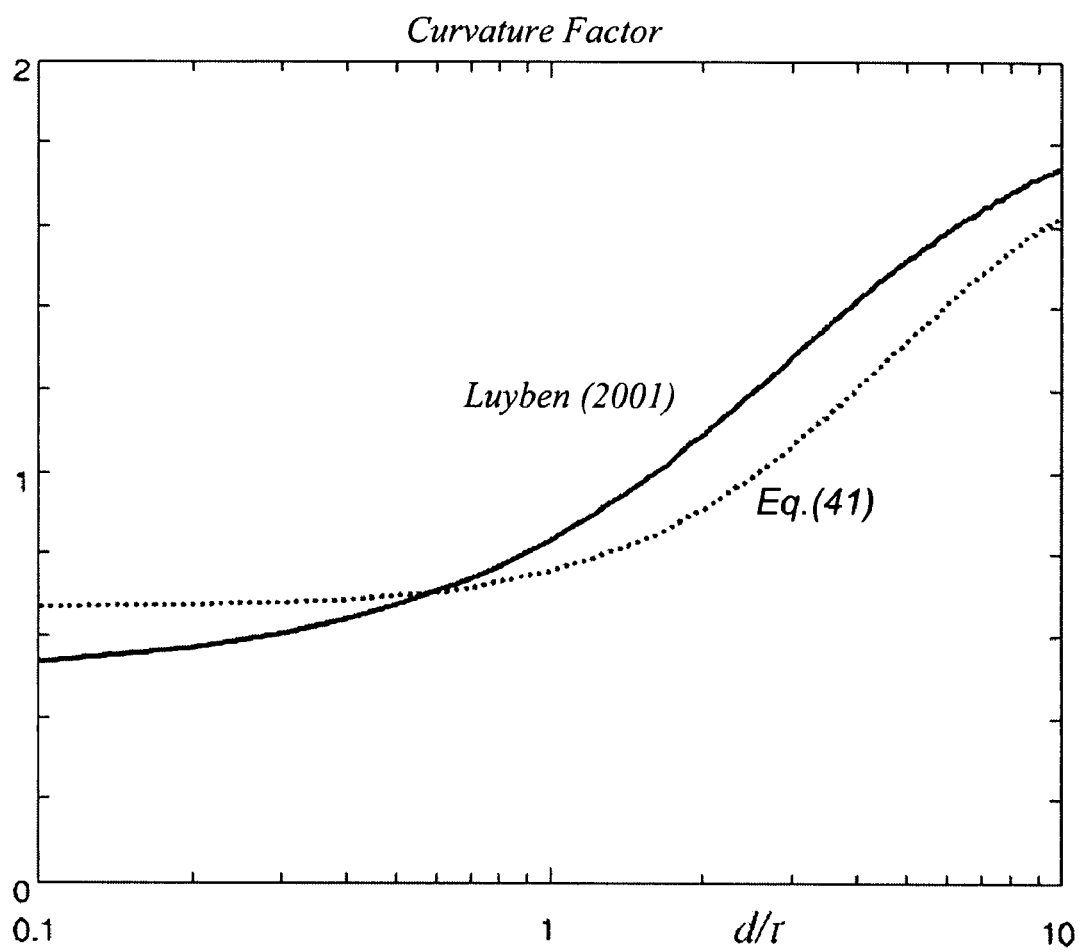
FIG. 10 is a view illustrating a relationship between a curvature and a $(G(s)=\exp(-ds)/(\tau s+1))$ of a first order time delay process.

FIG. 10 is a view illustrating a curvature factor of [12] Luyben (2001) with respect to a first order plus time delay process and an equation 41. The equation 41 according to the present invention may be applied for determining which modeling method will be used before the modeling work is performed. For example, as shown in FIG. 8, the equation 32 may not be used when the value of the equation 41 is greater than about 0.7 ($d/\tau$ is about 1.0).

Figure 11:
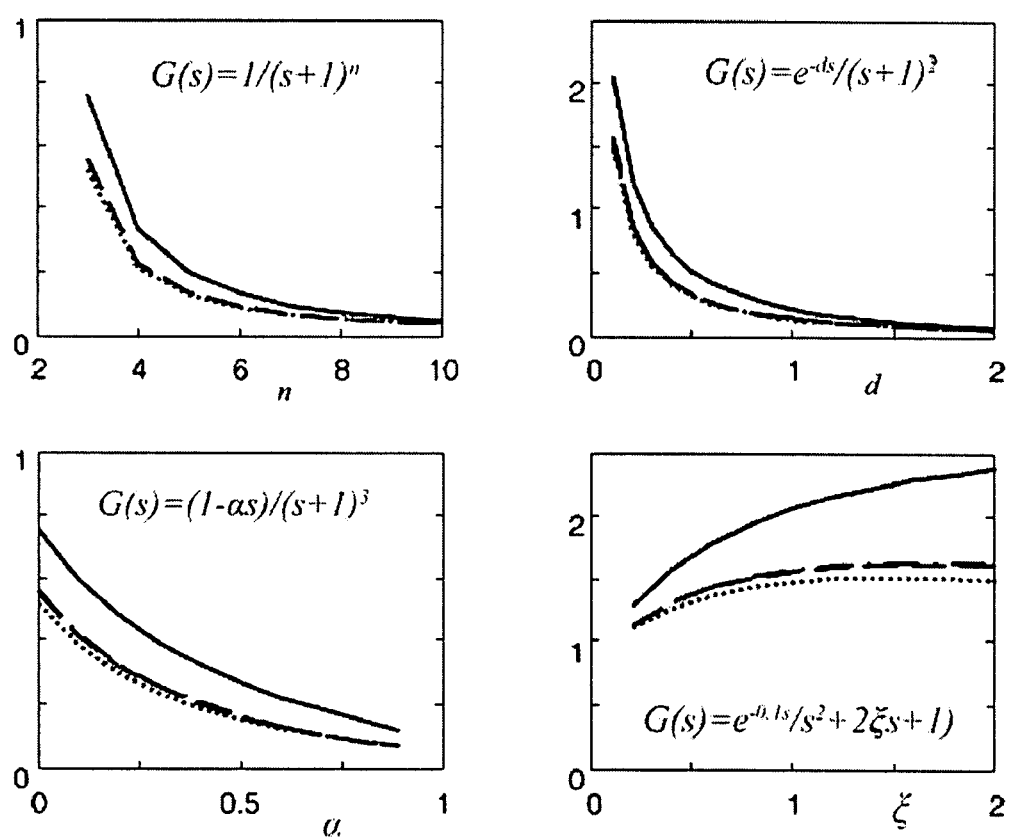
FIG. 11 is a view illustrating a first order time delay modeling performance (Solid line: Eq. (32), dotted line: Eq. (34)+Eq. (37), dashed line: Eq. (35)+Eq. (38) and Eq. (36)+Eq. (39)) in a higher order process.

FIG. 11 is a view illustrating a performance comparison between the methods of the present invention and the conventional methods with respect to various processes. IAE (The Integral of Absolute Error) is defined as follows. The smaller the value of the IAE, the better the performance.

$$IAE = \int_0^{2\pi/p} \frac{|G_m(j\tilde{\omega}) - G(j\tilde{\omega})|}{|G(j\tilde{\omega})|} d\tilde{\omega} \qquad \text{[Equation 42]}$$

The methods (equations 34~39) according to the present invention show excellent performances as compared to the conventional methods (equation 32).

6. Proposed Method for Critically Damped Second Order Plus Time Delay Model Estimation The critically damped second order plus time delay model is as follows.

$$G_m(s) = \frac{k\exp(-ds)}{(\tau s + 1)^2} \qquad \text{[Equation 43]}$$

For the steady state gain k, Equation 31 is used. From equation 24 and $A_\omega = |G_m(j\omega)| = k/((\tau\omega)^2+1)$, we have $$\tau = \frac{p}{2\pi}\sqrt{\frac{2khp}{\pi^2\sqrt{q_b}} - 1} \qquad \text{[Equation 44]}$$

An analytic equation for the oscillation period ([15] Panda and Yu, 2005; [27] Yu, 2006) is $$\exp\left(-\frac{d}{\tau}\right) + c_3\frac{d}{\tau} - c_4 = 0 \qquad \text{[Equation 45]}$$

where $$c_3 = \frac{2\beta}{1+\beta}$$

$$c_4 = \frac{2((1 + p/(2\tau))\beta + \beta^2)}{(1+\beta)^2}$$

$$\beta = \exp(-p/(2\tau))$$

Equation 45 can be solved by the Newton-Raphson method with an initial estimate $$\frac{d}{\tau} = \frac{p}{2\tau}\left(1 - \frac{2}{\pi}\arctan\left(\frac{2\pi\tau}{p}\right)\right) \qquad \text{[Equation 46]}$$

7. Method for Second Order Plus Time Delay Model Estimation

A general second order plus time delay (SOPTD) model is $$G_m(s) = \frac{k\exp(-ds)}{a_2 s^2 + a_1 s + 1} \qquad \text{[Equation 47]}$$

We use the process steady state gain information of equation 28, its derivative of equation 29, $q_b$ of equation 17 and the oscillation period p. We solve $$k = G_m(0) = \frac{y_{bm}}{u_{bm}} \qquad \text{[Equation 48]}$$

$$k(-d - a_1) = G'_m(0) \qquad \text{[Equation 49]}$$

$$q_b = \frac{16h^2}{\pi^2\omega^2}(|G_m(j\omega)|^2) \qquad \text{[Equation 50]}$$

$$= \frac{16h^2}{\pi^2\omega^2}\frac{k^2}{(1-a_2\omega^2)^2 + (a_1\omega)^2}$$

$$d = \frac{p}{2}(1 - \arctan(q_c/\omega) - \arctan2(1 - a_1\omega^2, a_2\omega)) \qquad \text{[Equation 51]}$$

The computational procedure is as follows, which is shown in FIG. 4.

Step 0: From relay feedback response, obtain $G_m(0)$, $G'_m(0)$, $q_b$ and the oscillation period p. Let $d = p/4$.

Step 1: Calculate $a_1$ from equation 49.

Step 2: Calculate $a_2$ from equation 50.

Step 3: Adjust d and repeat Steps 1 and 2 so that equation 51 is satisfied.

Figure 12:
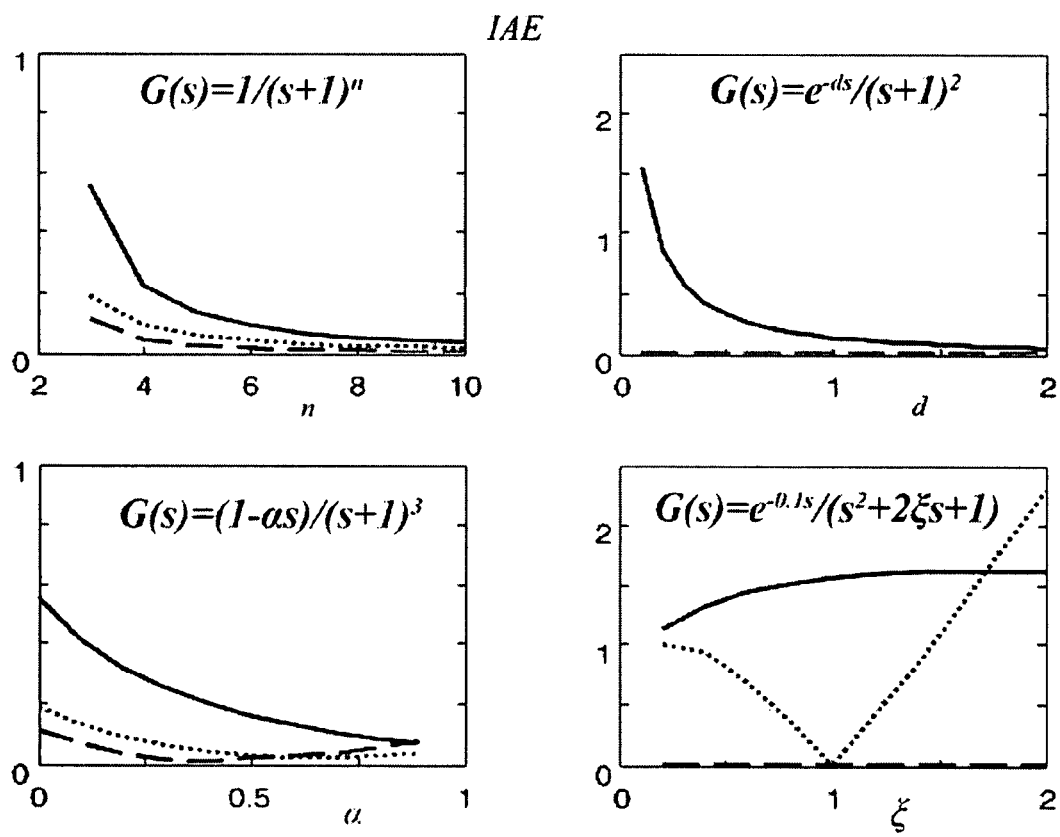
FIG. 12 is a view illustrating a first order time delay modeling performance (Solid line: FOPTD model, dotted line: CDPTD model, dashed line: SOPTD model) in a higher order process.

FIG. 12 is a view illustrating the IAE values of the methods invented with respect to the various processes. In most cases, the critically damped second order plus time delay model shows better results as compared to the first order plus time delay model of the equations 31, 33, 36 and 39. The second order plus time delay model has the most excellent results. However, the second order plus time delay model needs more measurements and iterative computations.

8. Simulation (Tuning Parameter Computation and Application)

Simulations are performed to investigate the performances of methods under sampling, discretization errors and noisy environments. The following process is considered.

$$G(s) = \frac{\exp(-1.2s)}{(s+1)^2(0.5s+1)} \qquad \text{[Equation 52]}$$

Uniformly distributed noise n(t) with mean value and magnitude of 0 and 0.1 is introduced to the output. For noisy responses, $q_a$ should be adjusted ([3] Astrom and Hagglund, 1995) as $$q_a = \frac{2}{p}\int_{t_1}^{t_1+p} y_a(t)^2 dt - 2\sigma_a^2, \; \sigma_a^2 \quad \text{[Equation 53]}$$

$$= \frac{1}{T}\int_0^T n(t)^2 dt$$

The noise characteristics, $$\sigma_a^2 = \int_0^T n(t)^2 \, dt/T,$$

can be estimated before starting the relay feedback test. Similarly, $q_b$ needs to be adjusted as in $q_a$ when noise is involved.

Figure 13:
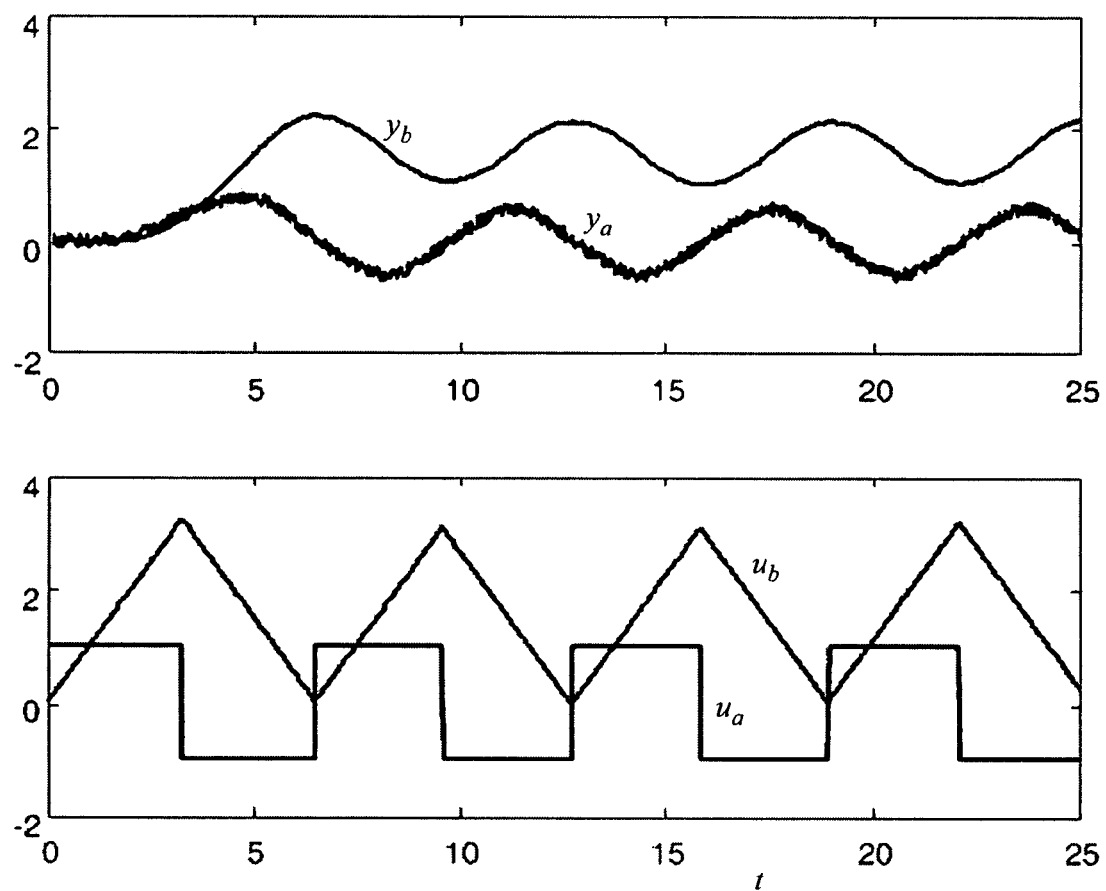
FIG. 13 is a view illustrating a relay feedback response under a measurement noise condition.
Figure 14:
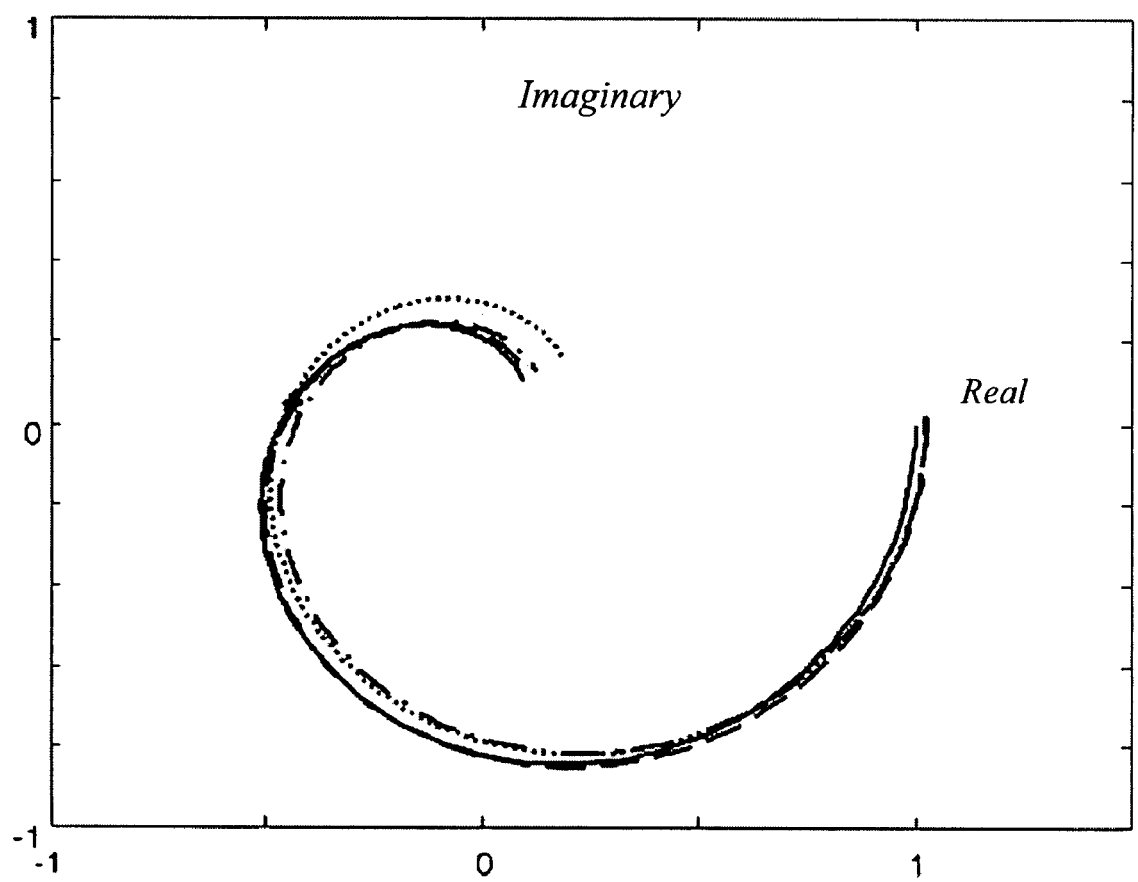
FIG. 14 is a view illustrating a modeling performance (Solid line: process, dotted line: FOPTD model, dash-dotted line: CDPTD model, and dashed line: SOPTD model).

Simulation results are shown in FIG. 13. Models obtained are in Table 2 and their Nyquist plots are in FIG. 14. Table 2 is a modeling result of the methods proposed in the present invention.

TABLE 2

| Process | Run No. | Output Noise Size | G(0) (1.00)* | G'(0) (−3.70)* | Identified Models | IAE |
|---|---|---|---|---|---|---|
| $\dfrac{\exp(-1.2s)}{(s+1)^2(0.5s+1)}$ | 1 | 0 | 1.009 | −3.780 | $\dfrac{1.009\exp(-2.210s)}{1.968s+1}$ | 0.093 |
| | | | | | $\dfrac{1.009\exp(-1.574s)}{(1.107s+1)^2}$ | 0.019 |
| | | | | | $\dfrac{1.009\exp(-1.565s)}{1.191s^2+2.215s+1}$ | 0.013 |
| | 2 | 0.1 | 1.025 | −4.114 | $\dfrac{1.025\exp(-2.0961s)}{2.011s+1}$ | 0.062 |
| | | | | | $\dfrac{1.025\exp(-1.465s)}{(1.112s+1)^2}$ | 0.039 |
| | | | | | $\dfrac{1.025\exp(-1.657s)}{0.974s^2+2.457s+1}$ | 0.085 |
| | 3 | 0.1 | 1.002 | −3.432 | $\dfrac{1.002\exp(-2.076s)}{2.030s+1}$ | 0.076 |
| | | | | | $\dfrac{1.002\exp(-1.443s)}{(1.117s+1)^2}$ | 0.040 |
| | | | | | $\dfrac{1.002\exp(-1.317s)}{1.724s^2+2.115s+1}$ | 0.053 |

*Exact value

For the FOPTD model, estimation equations of 31, 33, 36 and 39 are used. Because the Equation 52 is an overdamped process with a moderate time delay, all models estimated have excellent agreement with the true model, as shown by the Nyquist plot of FIG. 14.

9. Conclusion

Without modifying the original relay feedback system, simple and accurate estimates of process ultimate data are easily obtained. We use various integrals of the relay responses instead of point data to reduce the effects of the high harmonic terms. For FOPTD processes, errors over 15% of the previous approaches in estimating the ultimate gain can be reduced to below 5%. We derived the equations to extract a FOPTD, CDPTD and SOPTD models from the process information at the steady state and near the ultimate frequency. They are very simple and can be applied easily to commercial PID controllers.

10. Appendix A (Orthogonality of Trigonometric Functions ([11] Kreyzig, 1999))

For a set of trigonometric functions, $\{1, \cos(\omega t), \cos(2\omega t), \ldots, \sin(\omega t), \sin(2\omega t), \ldots\}$, we have $$\frac{2}{p}\int_t^{t+p}\sin(n\omega t)\sin(m\omega t)dt = \begin{cases} 0, & n \neq m \\ 1, & n = m \end{cases} \quad \text{[Equation 54]}$$

$$\frac{2}{p}\int_t^{t+p}\sin(n\omega t)\cos(m\omega t)dt = 0$$

-continued $$\frac{2}{p}\int_t^{t+p}\cos(n\omega t)\cos(m\omega t)dt = \begin{cases} 0, & n \neq m \\ 1, & n = m \neq 0 \\ 2, & n = m = 0 \end{cases}$$

for $p = 2\pi/\omega$.

Applying these relationships, we can derive equations 16 and 17. For example, for a function of $$f(t) = \alpha_0 + \alpha_1\cos(\omega t) + \beta_1\sin(\omega t) + \alpha_2\cos(2\omega t) + \beta_2\sin(2\omega t) + \ldots,$$

$$\frac{2}{p}\int_{t}^{t_1+p} f(t)^2 dt = 2\alpha_0^2 + \alpha_1^2 + \beta_1^2 + \alpha_2^2 + \beta_2^2 + \ldots \quad \text{[Equation 55]}$$

11. Appendix B (Moment Analyses ([3] Astrom and Hagglund, 1995))

Since $$\tilde{U}_a(s) \equiv (1 - \exp(-ps))\int_0^{t_1} u_a(t)\exp(-st)dt + \int_{t_1}^{t_1+p} u_a(t)\exp(-st)dt \quad \text{[Equation 56]}$$

we have $$\tilde{U}'_a(s) \equiv \quad \text{[Equation 57]}$$
$$pe^{-ps}\int_0^{t_1} u_a(t)e^{-st}dt + (1-e^{-ps})\int_0^{t_1}(-t)u_a(t)e^{-st}dt + \int_{t_1}^{t_1+p}(-t)u_a(t)e^{-st}dt$$

$$\tilde{U}''_a(s) \equiv -p^2 e^{-ps}\int_0^{t_1} u_a(t)e^{-st}dt - 2pe^{-ps}\int_0^{t_1} tu_a(t)e^{-st}dt + (1-e^{-ps})\int_0^{t_1} t^2 u_a(t)e^{-st}dt + \int_1^{t_1+p} t^2 u_a(t)e^{-st}dt$$

Then applying integration by parts:

$$\tilde{U}'_a(0) = p\int_0^{t_1} u_a(t)dt - \int_1^{t_1+p} tu_a(t)dt \quad \text{[Equation 58]}$$
$$= pu_b(t_1) - tu_b(t)\Big|_{t_1}^{t_1+p} + \int_1^{t_1+p} u_b(t)dt$$
$$= \int_{t_1}^{t_1+p} u_b(t)dt$$

$$\tilde{U}''_a(0) = -p^2\int_0^{t_1} u_a(t)dt - 2p\int_0^{t_1} tu_a dt + \int_1^{t_1+p} t^2 u_a(t)dt$$
$$= 2p\int_0^{t_1} u_b(t)dt - 2\int_1^{t_1+p} tu_b(t)dt$$

where $$u_b(t) = \int_0^{t_1} u_a(t)dt$$

and $u_a(t)$ and $u_b(t)$ are periodic after $t=t_1$.

By applying the same procedure to $$\tilde{Y}_a(s) \equiv (1 - \exp(-ps))\int_0^{t_1} y_a(t)\exp(-st)dt + \int_1^{t_1+p} y_a(t)\exp(-st)dt \quad \text{[Equation 59]}$$

we can obtain equations for $\tilde{Y}'_a(0)$ and $\tilde{Y}''_a(0)$:

$$\tilde{Y}'_a(0) = \int_{t_1}^{t_1+p} y_b(t)dt \quad \text{[Equation 60]}$$

$$\tilde{Y}''_a(0) = 2p\int_0^{t_1} y_b(t)dt - 2\int_{t_1}^{t_1+p} ty_b(t)dt$$

In the present invention, an autotuning method using an integral of a relay feedback response according to the present invention can greatly remove effects of harmonics by integrating a relay feedback signal and using the same, so that an ultimate data and frequency model of a process can be accurately obtained.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An autotuning method using an integral of a relay feedback response wherein the autotuning method is implemented by a proportional integral derivative controller, the method comprising the steps of:
   integrating a process data to significantly remove the effects of harmonics wherein the proportional integral derivative controller integrates the process data; and
   computing an ultimate gain wherein the proportional integral derivative controller computes the ultimate gain by $$K_{cu} = \frac{2hp}{\pi^2 b}$$

wherein b is an amplitude of a $y_b(\tilde{t})-y_{bm}$ signal wherein h is a relay amplitude wherein p is a period of a relay feedback oscillation.

2. An autotuninq method using an integral of a relay feedback response wherein the autotuninq method is implemented by a proportional integral derivative controller, the method comprising the steps of:
   integrating a process data to significantly remove the effects of harmonics wherein the proportional integral derivative controller integrates the process data; and
   computing an ultimate gain wherein the proportional integral derivative controller computes the ultimate gain by $$K_{cu} = \frac{16h}{\pi(a + 6\pi b/p)} = \frac{1}{\frac{1}{4}\left(\frac{\pi a}{4h}\right) + \frac{3}{4}\left(\frac{\pi^2 b}{2hp}\right)}$$

wherein b is an amplitude of a $y_b(\tilde{t})-y_{bm}$ signal wherein h is a relay amplitude wherein p is a period of a relay feedback oscillation.

3. An autotuninq method using an integral of a relay feedback response wherein the autotuning method is implemented by a proportional integral derivative controller, the method comprising the steps of:
   integrating a process data to significantly remove the effects of harmonics wherein the proportional integral derivative controller integrates the process data; and computing an ultimate gain wherein the proportional integral derivative controller computes the ultimate gain by $$K_{cu} = \frac{4h}{\pi\sqrt{q_a}}$$

wherein h is a relay amplitude wherein $q_a$ is derived by applying an orthogonality of sine and cosine functions to an output trajectory signal wherein $$q_a \equiv \frac{2}{p}\int_{t_1}^{t_1+p} y_a(t)^2 dt = \frac{16h^2}{\pi^2}\left(|G(j\omega)|^2 + \frac{1}{9}|G(j3\omega)|^2 + \ldots\right).$$

4. An autotuninq method using an integral of a relay feedback response wherein the autotuninq method is implemented by a proportional integral derivative controller, the method comprising the steps of:

integrating a process data to significantly remove the effects of harmonics wherein the proportional integral derivative controller integrates the process data; and computing an ultimate gain wherein the proportional integral derivative controller computes the ultimate gain by $$K_{cu} = \frac{2hp}{\pi^2\sqrt{q_b}}$$

wherein h is a relay amplitude wherein p is a period of a relay feedback oscillation wherein $q_b$ is derived by applying an orthogonality of sine and cosine functions to an integral signal of a process output wherein $$q_b \equiv \frac{2}{p}\int_{t_1}^{t_1+p} y_a(t)^2 dt - 2y_{bm}^2 \frac{16h^2}{\pi^2\omega^2}\left(|G(j\omega)|^2 + \frac{1}{81}|G(j3\omega)|^2 + \ldots\right).$$

5. The method of claim 4 further comprising the step of:

providing a frequency process model and a parameter model after removing any effects of harmonics wherein the proportional integral derivative controller has the frequency process model and the parameter model wherein the frequency process model has a set of an amplitude ratio and a phase angle wherein the parameter model has one of a first and a second order plus time delay model.

6. The method of claim 5 wherein the proportional integral derivative controller obtains the frequency process model by obtaining an amplitude ratio based on $$\hat{A}_\omega = \frac{\pi\sqrt{q_a}}{4h}$$

wherein $q_a$ is derived by applying an orthogonality of sine and cosine functions to an output trajectory signal wherein $$q_b \equiv \frac{2}{p}\int_{t_1}^{t_1+p} y_a(t)^2 dt - 2y_{bm}^2 \frac{16h^2}{\pi^2\omega^2}\left(|G(j\omega)|^2 + \frac{1}{81}|G(j3\omega)|^2 + \ldots\right).$$

7. The method of claim 5 wherein the proportional integral derivative controller obtains the frequency process model by obtaining the phase angle based on $$\phi_\omega = \arctan\left(\frac{p}{2\pi}\right)q_c$$

wherein $$q_c = \left[\frac{2}{p}\int_{t_1}^{t_1+p} u_a(t)y_b(t)dt\right] / \left[\frac{2}{p}\int_{t_1}^{t_1+p} u_b(t)y_b(t)dt - 2u_{bm}y_{bn}\right]$$

$$= \frac{\frac{8ph^2}{\pi^3}\left[\sin(\angle G(j\omega)) + \frac{|G(j3\omega)|}{27|G(j\omega)|}\sin(\angle G(j3\omega)) + \ldots\right]}{\frac{4p^2h^2}{\pi^4}\left[\cos(\angle G(j\omega)) + \frac{|G(j3\omega)|}{81|G(j\omega)|}\cos(\angle G(j3\omega)) + \ldots\right]}$$

$$= \frac{2\pi}{p}\left[\frac{\sin(\phi_\omega)}{\cos(\phi_\omega)} + \frac{|G(j3\omega)|}{|G(j\omega)|}\left(-\frac{\sin(\angle G(j3\omega))}{27\cos(\phi_\omega)} + \frac{\sin(\phi_\omega)\cos(\angle G(j3\omega))}{81\cos^2(\phi_\omega)}\right) + \ldots\right].$$

8. The method of claim 5 wherein the proportional integral derivative controller obtains the frequency process model by obtaining the amplitude ratio based on $$\hat{A}_\omega = \frac{\pi^2\sqrt{q_b}}{2hp}.$$

9. The method of claim 5 wherein the proportional integral derivative controller obtains the first order plus time delay model by obtaining a time constant based on $$\tau = \left(\frac{b}{kh} + \frac{p}{4}\right) / \ln(\chi_1)$$

$$\chi_1^{c_1} - 2\chi_1 + 1 = 0$$

$$c_1 = p / \left(\frac{2b}{kh} + \frac{p}{2}\right)$$

wherein $k = \frac{y_{bm}}{u_{bm}}$.

10. The method of claim 5 wherein the proportional integral derivative controller obtains the first order plus time delay model by obtaining a time constant based on $$\tau = p/(4\chi_2)$$

$$\chi_2 = \frac{1}{c_2}\tanh(\chi_2)$$

$$c_2 = 1 - \frac{q_a}{2k^2h^2}$$

wherein $k = \frac{y_{bm}}{u_{bm}}$ wherein $q_a$ is derived by applying an orthogonality of sine and cosine functions to an output trajectory signal wherein $$q_b \equiv \frac{2}{p}\int_{t_1}^{t_1+p} y_a(t)^2 dt - 2y_{bm}^2 \frac{16h^2}{\pi^2 \omega^2}\left(|G(j\omega)|^2 + \frac{1}{81}|G(j3\omega)|^2 + \dots\right).$$

11. The method of claim 5 wherein the proportional integral derivative controller obtains the first order plus time delay model by obtaining a time constant based on $$\tau = p/(4\chi_3)$$
$$-c_3\chi_3^3 + \chi_3 = \tanh(\chi_3)$$
$$c_3 = \frac{1}{3} - \frac{8q_b}{p^2k^2h^2}$$

wherein $k = \frac{y_{bm}}{u_{bm}}$.

12. The method of claim 5 wherein the proportional integral derivative controller obtains the first order plus time delay model by using an approximate equation of $$\chi_1 = \left[2 + \frac{1-6(1-c_1/2)^4}{1-2(c_1/2)^{-1/(c_1-1)}}\right]^{1/(c_1-1)}$$

wherein $c_1 = p/((2b/kh))+(p/2))$.

13. The method of claim 5 wherein the proportional integral derivative controller obtains the first order plus time delay model by using an approximate equation of $$\chi_2 = \frac{1}{c_2}\tanh\left(\sqrt{15\frac{1-c_2}{6c_2-1}}\right)$$

wherein $c_2 = 1-(q_a/2k^2h^2)$ wherein $q_a$ is derived by applying an orthogonality of sine and cosine functions to an output trajectory signal wherein $$q_b \equiv \frac{2}{p}\int_{t_1}^{t_1+p} y_a(t)^2 dt - 2y_{bm}^2 \frac{16h^2}{\pi^2 \omega^2}\left(|G(j\omega)|^2 + \frac{1}{81}|G(j3\omega)|^2 + \dots\right).$$

14. The method of claim 5 wherein the proportional integral derivative controller obtains the first order plus time delay model by using an approximate equation of $$\chi_3 = \frac{\sqrt{1-\sqrt{c_3}\tanh(1/\sqrt{c_3})}}{\sqrt{c_3}}$$

wherein $c_3 = 1/3 - (8q_b/p^2k^2h^2)$.

15. The method of claim 5 wherein the proportional integral derivative controller obtains the first order plus time delay model by obtaining a time constant based on $$\tau = \frac{p}{2\pi}\sqrt{\frac{4p^2k^2h^2}{\pi^2 q_b}-1}$$

wherein $k = \frac{y_{bm}}{u_{bm}}$.

16. The method of claim 5 further comprising the step of:

estimating a ratio of a time delay and a time constant of the first order plus time delay model based on a curvature factor of $$F = q_a/a^2$$

wherein the proportional integral derivative controller estimates the ratio of the time delay and the time constant of the first order plus time delay model.

17. The method of claim 5 further comprising the step of:

obtaining the second order plus time delay model wherein the second order plus time delay model is critically damped by obtaining a time constant based on $$\tau = \frac{p}{2\pi}\sqrt{\frac{2khp}{\pi^4\sqrt{q_b}}-1}$$

wherein $k = \frac{y_{bm}}{u_{bm}}$ wherein the proportional integral derivative controller obtains the critically damped second order plus time delay model.

18. The method of claim 5 further comprising the steps of:

setting a second time delay model of $$G_m(S) = \frac{k\exp(-ds)}{a_2 s^2 + a_1 s + 1};$$

wherein the proportional integral derivative controller sets the second time delay model;

obtaining $G_m(0)$, $G_m'(0)$, $q_b$ and an oscillation period p from relay feedback response and determining $d=p/4$ wherein the proportional integral derivative controller obtains $G_m(0)$, $G_m'(0)$, $q_d$ and the oscillation period p and determines $d=p/4$;

computing $a_1$ from $k(-d-a_1)=G_m^1(0)$ after obtaining $G_m(0)$, $G_m'(0)$, $q_b$ and the oscillation period p from relay feedback response and determining $d=p/4$ wherein the proportional integral derivative controller computes $a_1$;

computing $a_2$ from $$q_b = \frac{16h^2}{\pi^2\omega^2}(|G_m(j\omega)|^2) = \frac{16h^2}{\pi^2\omega^2}\frac{k^2}{(1-a_2\omega^2)^2+(a_1\omega)^2}$$

after computing $a_1$ wherein the proportional integral derivative controller computes $a_2$; and adjusting d so that $$d = \frac{p}{2}(1 - \arctan(q_c/\omega) - \text{arctan2}(1 - a_1\omega^2, a_2\omega))$$

is satisfied after computing $a_2$ wherein the proportional integral derivative controller adjusts d.

19. The method of claim 5 further comprising the step of: performing a tuning parameter computation and application in consideration with a process of $$G(s) = \frac{\exp(-1.2s)}{(s+1)^2(0.5s+1)}$$

wherein the proportional integral derivative controller performs the tuning parameter computation and application.

* * * * *